US009868368B2

(12) United States Patent
Yamada et al.

(10) Patent No.: US 9,868,368 B2
(45) Date of Patent: Jan. 16, 2018

(54) SEAT LIFTER APPARATUS FOR VEHICLE

(71) Applicant: AISIN SEIKI KABUSHIKI KAISHA, Kariya-shi (JP)

(72) Inventors: Yukifumi Yamada, Toyota (JP); Naoki Goto, Tokai (JP)

(73) Assignee: AISIN SEIKI KABUSHIKI KAISHA, Kariya-shi (JP)

(*) Notice: Subject to any disclaimer, the term of this patent is extended or adjusted under 35 U.S.C. 154(b) by 129 days.

(21) Appl. No.: 15/022,407

(22) PCT Filed: Aug. 26, 2014

(86) PCT No.: PCT/JP2014/072249
§ 371 (c)(1),
(2) Date: Mar. 16, 2016

(87) PCT Pub. No.: WO2015/041008
PCT Pub. Date: Mar. 26, 2015

(65) Prior Publication Data
US 2016/0229315 A1 Aug. 11, 2016

(30) Foreign Application Priority Data

Sep. 19, 2013 (JP) ................................. 2013-194673

(51) Int. Cl.
B60N 2/16 (2006.01)
B60N 2/06 (2006.01)
B60N 2/02 (2006.01)

(52) U.S. Cl.
CPC ......... B60N 2/1615 (2013.01); B60N 2/0232 (2013.01); B60N 2/06 (2013.01);
(Continued)

(58) Field of Classification Search
CPC ...... B60N 2/1615; B60N 2/165; B60N 2/167; B60N 2/169; B60N 2/0232; B60N 2/0252; B60N 2/06; B60N 2/0705
See application file for complete search history.

(56) References Cited

U.S. PATENT DOCUMENTS 9,604,550 B2 * 3/2017 Ito .................... B60N 2/0228
2013/0026806 A1 1/2013 Yamada et al.

FOREIGN PATENT DOCUMENTS

JP 2006-083983 A 3/2006
JP 4209101 B2 1/2009
(Continued)

OTHER PUBLICATIONS

International Search Report dated Sep. 22, 2014 for PCT/JP2014/072249 filed on Aug. 26, 2014.
(Continued)

Primary Examiner — Anita M King
(74) Attorney, Agent, or Firm — Oblon, McClelland, Maier & Neustadt, L.L.P.

(57) ABSTRACT

A rotation control apparatus includes an engagement lever configured to restrict a rotation of a pinion gear by engaging with a ratchet wheel and a drive lever driving and rotating the pinion gear in a direction where a seat moves upward by integrally rotating with an operation member in a state where the drive lever engages with the ratchet wheel based on a rotation operation of an operation handle in a first direction. The engagement lever disengages from the ratchet wheel by the rotation of the pinion gear in a case where the seat moves upward. The rotation control apparatus further includes an engagement lever control piece and a drive lever control piece which cause the engagement lever and the
(Continued)

drive lever respectively to disengage from the ratchet wheel based on the rotation operation of the operation handle in a second direction.

12 Claims, 21 Drawing Sheets

(52) U.S. Cl.
CPC ............ *B60N 2/165* (2013.01); *B60N 2/167* (2013.01); *B60N 2/169* (2013.01)

(56) References Cited

FOREIGN PATENT DOCUMENTS

| | | |
|---|---|---|
| JP | 2010-274691 A | 12/2010 |
| JP | 2012-046140 A | 3/2012 |
| JP | 2012-158301 A | 8/2012 |

OTHER PUBLICATIONS

International Preliminary Report on Patentability and Written Opinion dated Mar. 22, 2016 in PCT/JP2014/072249 filed Aug. 26, 2014.
International Preliminary Report on Patentability and Written Opinion dated Mar. 22, 2016 in PCT/JP2014/072249, filed Aug. 26, 2014.

\* cited by examiner

Rotation in first direction

Rotation in second direction

Rotation in first direction (halfway)

Rotation in first direction (maximum)

Rotation in second direction (halfway)

Rotation in second direction (maximum)

Rotation in first direction (halfway)

Rotation in first direction (maximum)

Rotation in second direction (halfway)

Rotation in second direction (maximum)

Rotation in first direction (input operation)

Rotation in first direction (maximum)

Rotation in first direction (return operation)

F: Returning force
θ : Rotation angle (operation amount α)

SEAT LIFTER APPARATUS FOR VEHICLE

TECHNICAL FIELD

This invention relates to a seat lifter apparatus for a vehicle.

BACKGROUND ART

A seat lifter apparatus that is capable of adjusting a position of a seat for a vehicle in an up-down direction generally includes a link mechanism supporting the seat at an upper side of the link mechanism via link members which are rotatably provided. In many cases, a sector gear is provided at any of the link members in a state sharing a rotation shaft with the aforementioned link member to integrally rotate therewith. The link member rotates on a basis of a driving force transmitted via the sector gear so that the seat which is supported at the upper side of the link mechanism is configured to move upward and downward.

For example, a seat lifter apparatus disclosed in Patent document 1 includes a pinion gear meshed with a sector gear and an operation handle coaxially provided at the pinion gear. In addition, a rotation control apparatus including two clutch portions which are coaxially arranged side by side is disposed between the pinion gear and the operation handle. Because of the rotation control apparatus, the pinion gear is driven to rotate on a basis of a reciprocating rotation which is input to the operation handle and a rotation position of the pinion gear is configured to be maintained.

DOCUMENT OF PRIOR ART

Patent Document

Patent document 1: Japanese Patent 4209101

OVERVIEW OF INVENTION

Problem to be Solved by Invention

Nevertheless, according to the aforementioned conventional art, the two clutch portions which are coaxially arranged side by side decrease mountability of the rotation control apparatus and the operation handle to the side of the seat. Because of a complicated construction and a difficulty in downsizing of the rotation control apparatus, a margin for improvement has been left.

The present invention is made to solve the aforementioned drawbacks and an object of the present invention is to provide a seat lifter apparatus for a vehicle including a rotation control apparatus which may be downsized by a simple construction.

Means for Solving Problem

A seat lifter apparatus for a vehicle according to an aspect of the present invention includes a link mechanism supporting a seat at an upper side of the link mechanism via a link member which is rotatably provided, a sector gear integrally rotating with the link member by sharing a rotation shaft with the link member, a pinion gear meshed with the sector gear, an operation handle operated to rotate in a first direction and a second direction by including a neutral position, and a rotation control apparatus disposed between the pinion gear and the operation handle, the rotation control apparatus including a ratchet wheel integrally rotating with the pinion gear by sharing a rotation shaft with the pinion gear, an operation member arranged at a position coaxial with the ratchet wheel to rotate on a basis of a rotation operation of the operation handle, an engagement lever configured to restrict a rotation of the pinion gear by engaging with the ratchet wheel, and a drive lever driving and rotating the pinion gear in a direction where the seat moves upward by integrally rotating with the operation member in a state where the drive lever engages with the ratchet wheel based on the rotation operation of the operation handle in the first direction, the engagement lever disengaging from the ratchet wheel by the rotation of the pinion gear in a case where the seat moves upward, the rotation control apparatus further including an engagement lever control piece and a drive lever control piece which cause the engagement lever and the drive lever respectively to disengage from the ratchet wheel based on the rotation operation of the operation handle in the second direction, the engagement lever control piece restricting an operation of the engagement lever disengaging from the ratchet wheel in a case where the operation handle is at the neutral position.

MODE FOR CARRYING OUT THE INVENTION

First Embodiment

Figure 1:
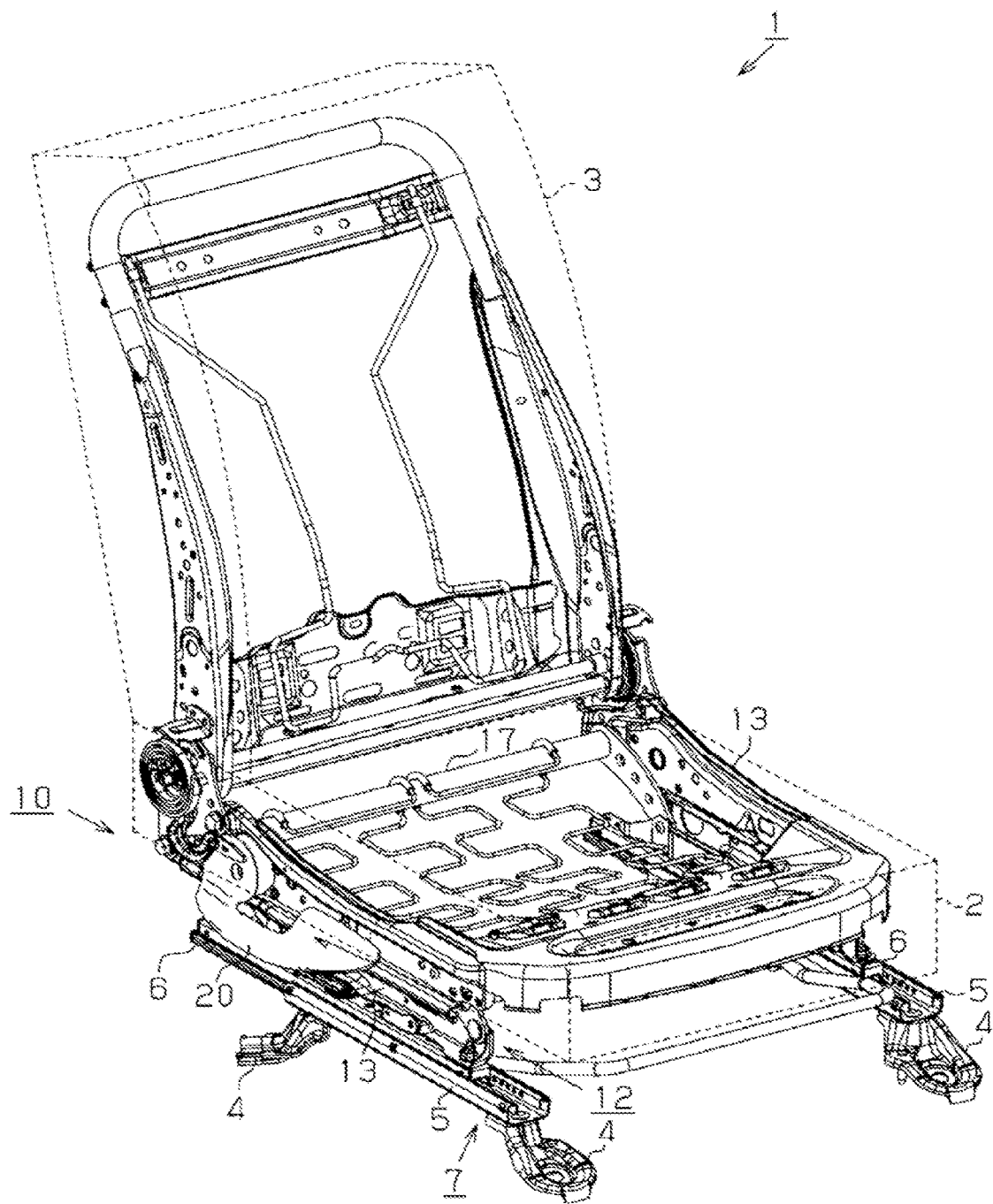
FIG. 1 is a perspective view of a seat for a vehicle.

A first embodiment of a seat lifter apparatus for a vehicle is explained with reference to drawings. As illustrated in FIG. 1, a seat 1 for a vehicle includes a seat cushion 2 and a seatback 3 provided at a rear end portion of the seat cushion 2 so as to be tiltable relative to the seat cushion 2.

Figure 2:
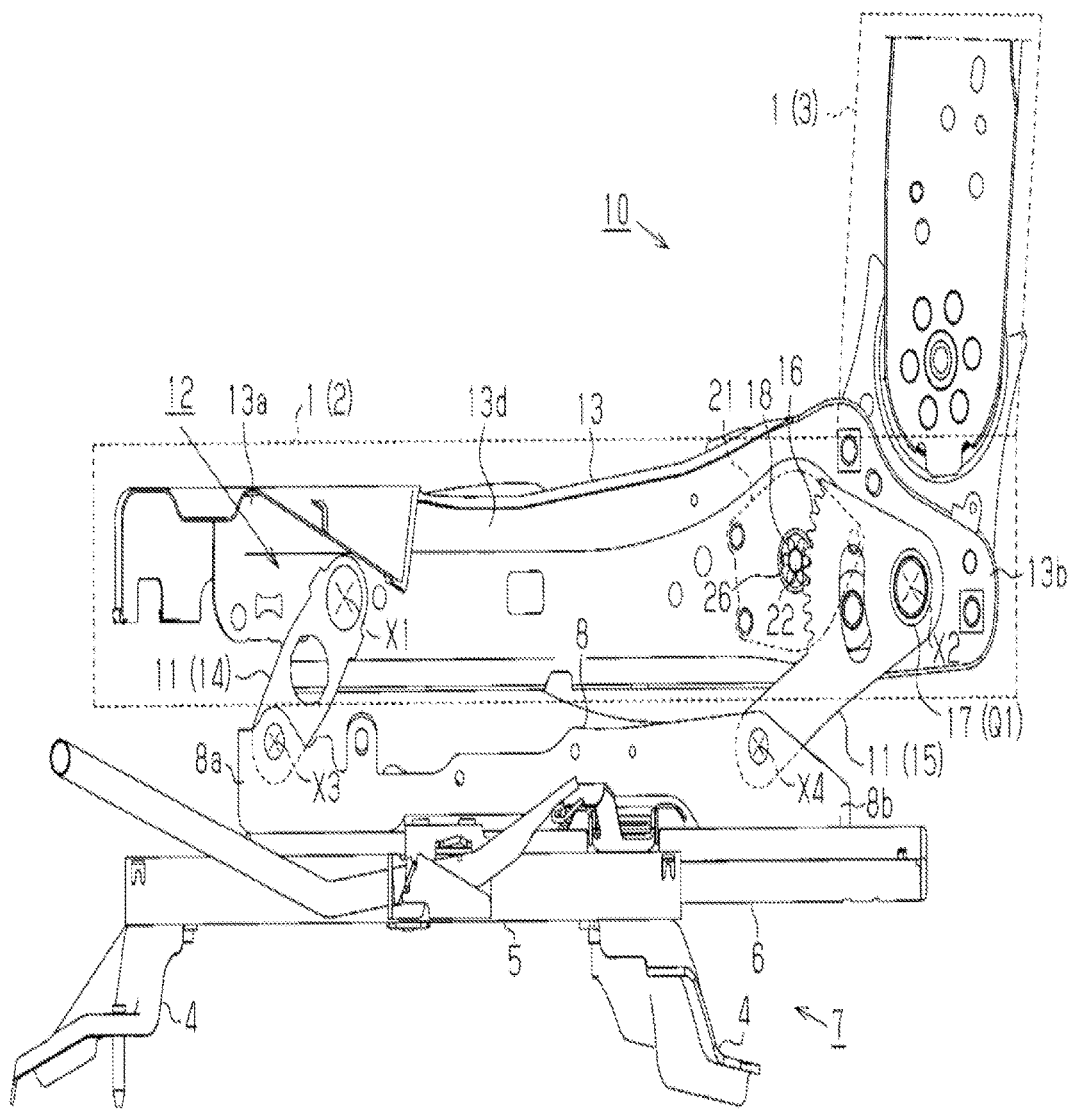
FIG. 2 is a side view of a seat lifter apparatus provided at the seat for the vehicle.
Figure 3:
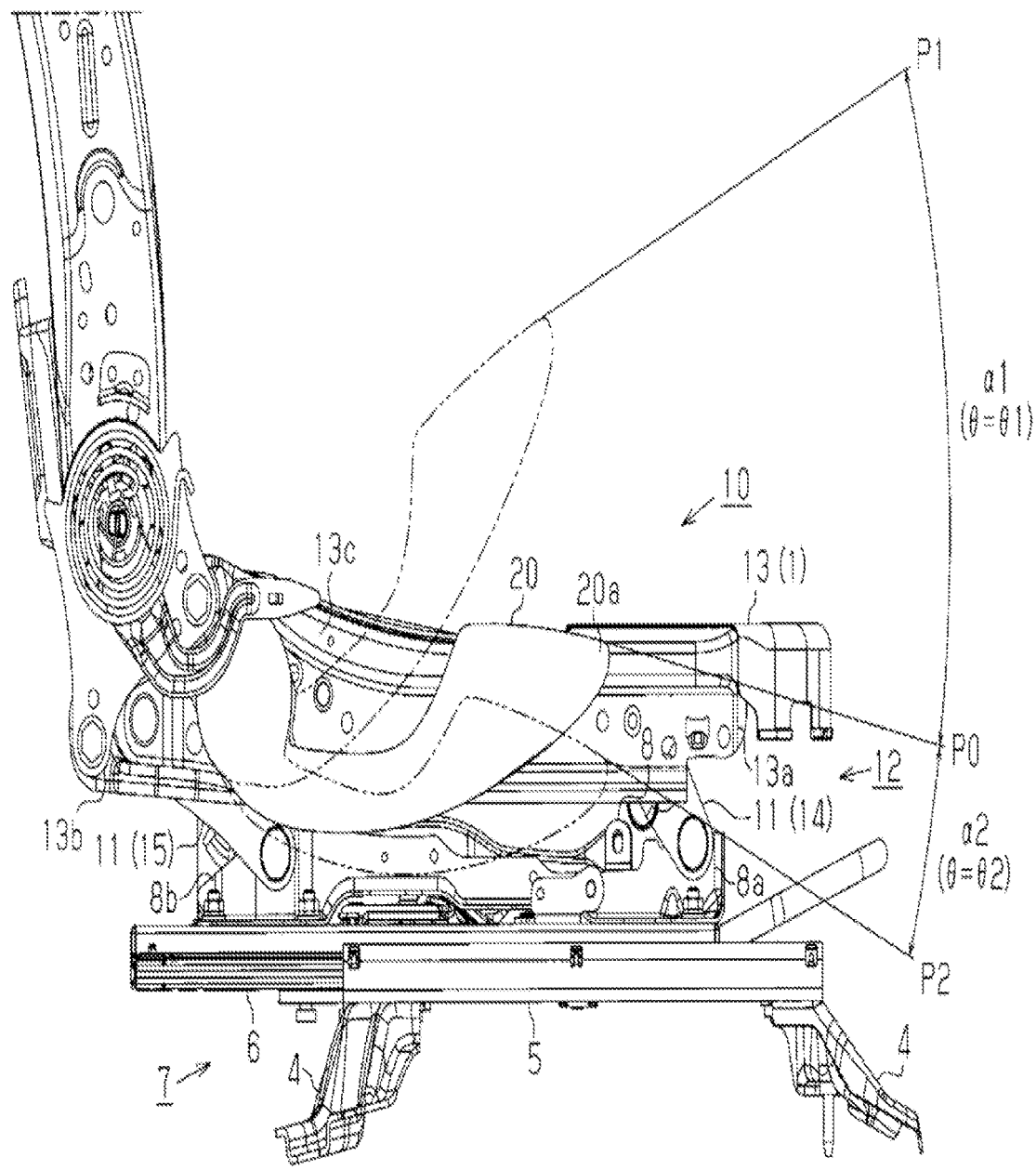
FIG. 3 is a side view of the seat for the vehicle.

As illustrated in FIGS. 2 and 3, in the present embodiment, a pair of right and left lower rails 5 supported at respective brackets 4 is provided at a floor portion of a vehicle not illustrated. In addition, upper rails 6 are mounted at the lower rails 5 to be movable relative to the lower rails 5. The seat 1 is supported upon the upper rails 6.

That is, according to the present embodiment, a seat slide apparatus 7 is constituted by the lower rails 5 and the upper rails 6 which are provided to be movable relative to each other. An occupant of the vehicle utilizes a function of the seat slide apparatus 7 so as to adjust a position of the seat 1 in a front-rear direction of the vehicle (i.e., right-left direction in FIG. 2).

In addition, the seat 1 of the present embodiment is fixed to the upper rails 6 via a seat lifter apparatus 10. The occupant of the vehicle utilizes a function of the seat lifter apparatus 10 so as to adjust a position of the seat 1 in an up-down direction (i.e., adjusting a height of the seat cushion 2).

The seat lifter apparatus 10 includes a link mechanism 12 supporting the seat 1 at an upper side of the link mechanism 12 by means of two link members 11 which are rotatably provided. One of the two link members 11 is provided as a front link 14 which is rotatably connected to a front end portion 13a of a side frame 13 constituting a frame of the seat cushion 2 and to a front end portion 8a of a support member 8 provided at the upper rail 6. The other of the link members 11 is provided as a rear link 15 which is rotatably connected to a rear end portion 13b of the side frame 13 and to a rear end portion 8b of the support member 8. That is, the link mechanism 12 of the present embodiment includes a known parallel link mechanism. Based on rotations of the respective link members 11, the seat 1 supported at the upper side of the link mechanism 12 is configured to move upward and downward.

As illustrated in FIG. 2, in the embodiment, connection points X1 and X2 of the front link 14 and the rear link 15 relative to the side frame 13 are disposed at a rear side of the vehicle than connection points X3 and X4 of the front link 14 and the rear link 15 relative to the support member 8. That is, the seat 1 supported at the upper side of the link mechanism 12 moves upward by the link members 11 that rotate so that the connection points X1 and X2 of the link members 11 relative to the side frame 13 move forward of the vehicle. The seat 1 moves downward by the link members 11 that rotate so that the connection points X1 and X2 move rearward of the vehicle.

In the present embodiment, a sector gear 16 is provided at one of the link members 11 constituting the aforementioned link mechanism 12, i.e., at the rear link 15 connected to the side frame 13 at a right side. The sector gear 16 is rotatable about the connection point X2. That is, the sector gear 16 integrally rotates with the rear link 15 while sharing a rotation shaft Q1 with the rear link 15. In the present embodiment, a torque rod 17 connecting between (the rear end portions 13b of) the right and left side frames 13 constitutes the rotation shaft Q1 of the rear link 15. The link mechanism 12 of the embodiment is configured to move the seat 1 that is supported at the upper side of the link mechanism 12 upward and downward by a driving of the rear link 15 via the sector gear 16.

Figure 4:
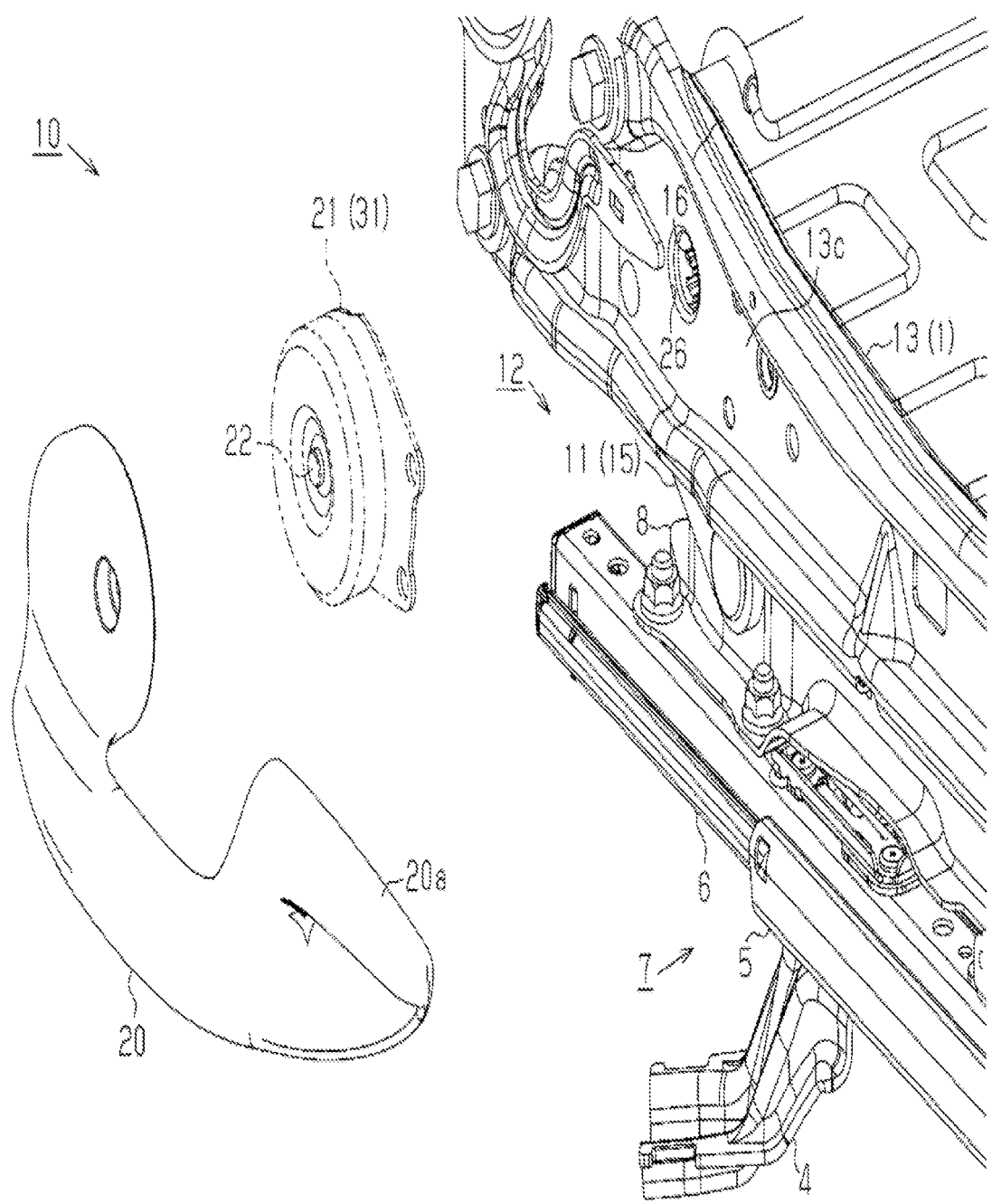
FIG. 4 is a perspective view of an operation handle and a rotation control apparatus constituting the seat lifter apparatus.

As illustrated in FIGS. 3 and 4, in the embodiment, an operation handle 20 is provided at an outer side of the side frame 13 in a width direction of the seat (at a front side of a paper on which FIG. 3 is drawn). The operation handle 20 is operated to rotate so that the seat 1 moves upward and downward. As illustrated in FIG. 2, a pinion gear 18 is meshed with the sector gear 16. In addition, as illustrated in FIGS. 2 and 4, a rotation control apparatus 21 is disposed between the pinion gear 18 and the operation handle 20.

That is, an operation torque input to the operation handle 20 is transmitted to the pinion gear 18 via the rotation control apparatus 21. Specifically, the operation torque generated in association with a pull-up operation of the operation handle 20, which is explained later, is transmitted to the pinion gear 18. Then, in the embodiment, the rotation of the pinion gear 18 is controlled by the rotation control apparatus 21 to thereby adjust the position of the seat 1 that is supported at the upper side of the link mechanism 12 in the up-down direction.

(Rotation Control Apparatus and Handle Returning Apparatus)

Next, constructions of the rotation control apparatus 21 and a handle returning apparatus 31 provided at the seat lifter apparatus 10 are explained.

As illustrated in FIGS. 4 to 8, the rotation control apparatus 21 of the embodiment includes a rotation shaft 22 including one end at which the pinion gear 18 is provided, and a bracket 23 supporting the rotation shaft 22 in a state where the rotation shaft 22 is rotatable.

The bracket 23 of the embodiment includes a first bracket 23A fixed to the side frame 13 constituting the frame of the seat cushion 2, specifically, to an outer side surface 13c of the side frame 13, and a second bracket 23B disposed to face the first bracket 23A. In the present embodiment, each of the first bracket 23A and the second bracket 23B is formed by deformation processing (press-working) of a metallic plate. In addition, the first bracket 23A and the second bracket 23B include penetration bores 25a and 25b respectively those of which face each other. The aforementioned rotation shaft 22 is rotatably supported in a state penetrating through the penetration bores 25a and 25b.

The side frame 13 of the embodiment includes a penetration hole 26 into which a first end portion 22a of the rotation shaft 22 at which the aforementioned pinion gear 18 is provided is insertable. In the present embodiment, by means of the penetration hole 26, the pinion gear 18 may be meshed with the sector gear 16 that is provided adjoined to an inner side surface 13d of the side frame 13 (see FIG. 2).

The rotation control apparatus 21 of the embodiment includes an input member 28 rotating in conjunction with the aforementioned operation handle 20 and a spring member 30 configured to be elastically deformed on a basis of a rotation operation relative to the operation handle 20. In the present embodiment, the rotation control apparatus 21 includes the handle returning apparatus 31 configured to return the operation handle 20, which is rotationally operated, to a neutral position P0 by biasing the input member 28 based on a returning force (i.e., an elastic force) generated by the spring member 30.

As illustrated in FIGS. 3 and 4, the operation handle 20 of the embodiment includes a handle portion 20a at a tip end, the handle portion 20a extending forward of the vehicle to include a lever form. In the operation handle 20, a position at which the handle portion 20a is substantially parallel to the floor portion of the vehicle is specified as the neutral position P0. A base end of the handle portion 20a is connected to the rotation control apparatus 21.

In the seat lifter apparatus 10 of the embodiment, the operation handle 20 is operated to rotate in a direction in which the handle portion 20a provided at the tip end of the operation handle 20 is pulled upward (in a first direction) and in a direction in which the handle portion 20a is pushed downward (in a second direction). In a case of no operation input, the operation handle 20 returns to the neutral position P0 as a basis for the rotation operation of the operation handle 20 by a function of the handle returning apparatus 31.

As illustrated in FIGS. 7 to 11, the handle returning apparatus 31 of the embodiment includes a first input member 28A and a second input member 28B coaxially arranged with each other and relatively rotatable to each other. In addition, the handle returning apparatus 31 of the embodiment includes a connection mechanism 32 connecting between the first input member 28A and the second input member 28B so that a torque transmission is achievable therebetween. In the present embodiment, the aforementioned operation handle 20 is fixed to the first input member 28A.

In the embodiment, each of the first and second input members 28A and 28B is formed by deformation processing (press-working) of a metallic plate. The first and second input members 28A and 28B include disc portions 33 and 34 respectively, the disc portions 33 and 34 including circular bores 33a and 34a at respective center portions. Each of the disc portions 33 and 34 is an example of a circular portion. A second end portion 22b of the rotation shaft 22 is inserted to the circular bores 33a and 34a so that the first and second input members 28a and 28b are supported by the rotation shaft 22 serving as a support shaft Q2 in a relatively rotatable manner.

Plural (in the embodiment, three) engagement bores 35 and plural (in the embodiment, three) engagement bores 36 are provided at the disc portions 33 and 34 of the first and second input members 28A and 28B respectively so as to extend in a circumferential direction at respective radially outer sides of the circular bores 33a and 34a. In the present embodiment, each of the engagement bores 35 and 36 forms an elongated bore in a substantially arc form. The engagement bores 35 are disposed at even intervals around the circular bore 33a. The engagement bores 36 are disposed at even intervals around the circular bore 34a. The handle returning apparatus 31 of the embodiment includes a connection member 38 which includes plural (in the embodiment, three) engagement projections 37 engaging with both of the engagement bores 35 and 36 of the first input member 28A and the second input member 28B.

In the present embodiment, the connection member 38 includes a substantially cylindrical outline. The engagement projections 37 are formed by cutting one end portion of the connection member 38 arranged adjacent to the second end portion 22b of the rotation shaft 22 (at an upper side in FIGS. 7 and 8) (i.e., a second end portion 38b) at even intervals in the circumferential direction. Each of the engagement projections 37 includes a cross-section in an arc shape extending in the circumferential direction, in the same way as the engagement bores 35 and 36 of the first input member 28A and the second input member 28B.

In the present embodiment, the connection member 38 is arranged to be coaxial with the rotation shaft 22 in a state where the rotation shaft 22 is inserted to be positioned within a cylinder portion of the connection member 38. Specifically, the connection member 38 is inserted to be positioned within the penetration bore 25b provided at the second bracket 23B. Each of the engagement projections 37 is inserted to be positioned within both the engagement bores 35 and 36 of the first and second input members 28A and 28B in a state where the engagement projection 37 penetrates through the first input member 28A and the second input member 28B (at a lower side in FIGS. 7 and 8) which is positioned closer to the second bracket 23B.

The handle returning apparatus 31 of the embodiment includes an attachment member 39 formed in a substantially disc form. The attachment member 39 includes an insertion bore 39a into which the second end portion 22b of the rotation shaft 22 is inserted to be positioned and plural (in the embodiment, three) fitting bores 39b fitted to respective ends of the engagement projections 37 which are inserted to the engagement bores 35 and 36. Then, in the embodiment, the disc portions 33 and 34 of the first and second input members 28A and 28B are sandwiched between the attachment member 39 and the second bracket 23B, specifically, between the attachment member 39 and a sliding plate 40

(see FIG. 5) attached to the penetration bore 25*b* of the second bracket 23B, to thereby restrict the first and second input members 28A and 28B from moving in an axial direction.

Figure 11:
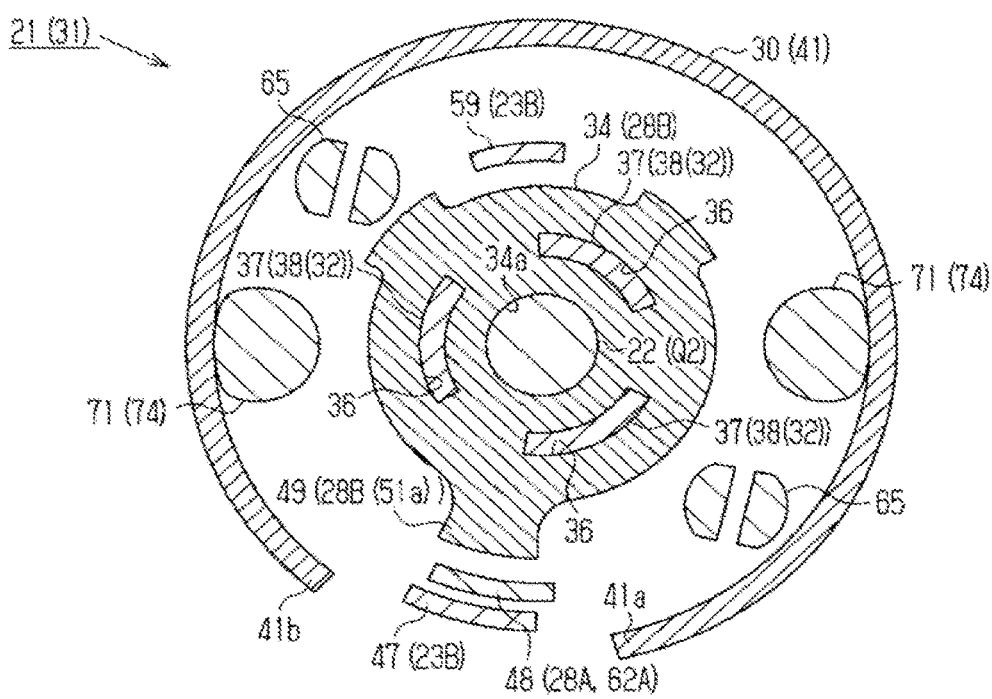
FIG. 11 is a cross-sectional view of the rotation control apparatus (cross-sectional view taken along line XI-XI in FIG. 7)

Here, as illustrated in FIG. 11, a circumferential length of each of the engagement bores 36 provided at the disc portion 34 of the second input member 28B is specified so as to be substantially equal to a circumferential length of each of the engagement projections 37. Thus, the engagement projection 37 is restricted from moving in the circumferential direction relative to the engagement bore 36 within which the engagement projection 37 is positioned. Consequently, the second input member 28B and the connection member 38 are connected to be relatively non-rotatable to each other.

Figure 10:
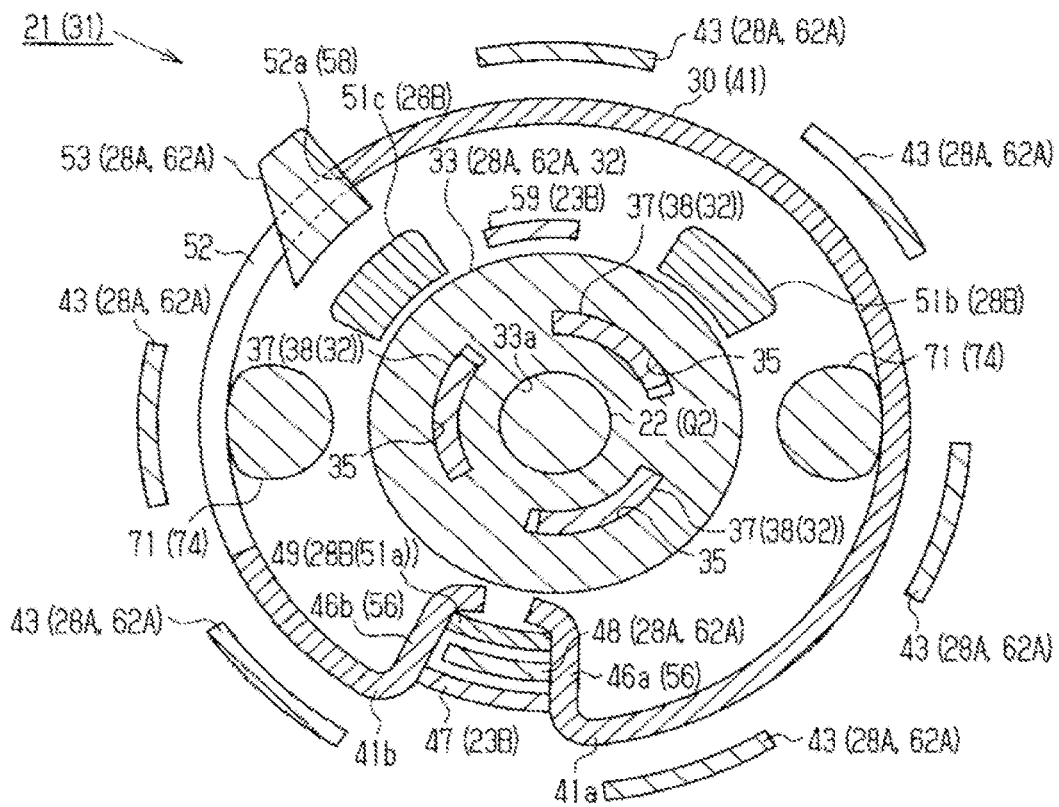
FIG. 10 is a cross-sectional view of the rotation control apparatus (cross-sectional view taken along line X-X in FIG. 7)

On the other hand, as illustrated in FIG. 10, a circumferential length of each of the engagement bores 35 provided at the disc portion 33 of the first input member 28A is specified so as to be longer than the circumferential length of each of the engagement projections 37. That is, the engagement projection 37 is movable in the circumferential direction within the engagement bore 35 relative thereto. Accordingly, the connection mechanism 32 is configured so that the first input member 28A and the second input member 28B are connected to each other in a state where the torque transmission is achievable therebetween and one of the first input member 28A and the second input member 28B is rotated in a delayed phase relative to the other of the first input member 28A and the second input member 28B.

That is, in the connection mechanism 32 of the embodiment, a rotation torque input to one of the first and second input members 28A and 28B may be transmitted to the other of the first and second input members 28A and 28B via the connection member 38 in a state where the engagement projections 37 inserted to the engagement bores 35 and 36 of the first and second input members 28A and 28B are in engagement with both the first and second input members 28A and 28B in a relatively non-rotatable manner in the circumferential direction.

Figure 12A:
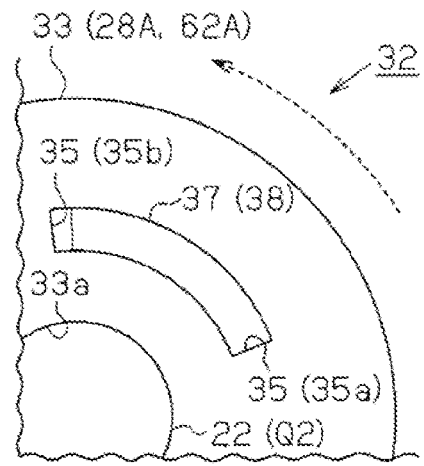
FIG. 12A and FIG. 12B are explanatory views of a connection mechanism.
Figure 12B:
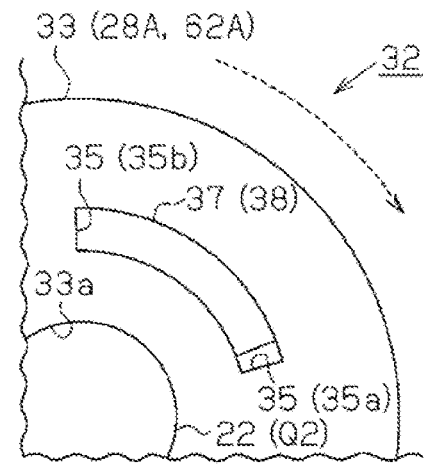

Nevertheless, as illustrated in FIGS. 12(*a*) and 12(*b*), according to the connection mechanism 32 of the embodiment, a small gap is formed in the circumferential direction between each of the engagement bores 35 of the first input member 28A and each of the engagement projections 37 based on the difference in the circumferential lengths between the engagement bore 35 and the engagement projection 37. Thus, in a case where the rotation torque is input to one of the first and second input members 28A and 28B, each of the engagement projections 37 moves within each of the engagement bores 35 relative thereto in a direction to decrease the aforementioned circumferential gap, so that the relative rotation between the first input member 28A and the second input member 28B is slightly allowed. Afterwards, the engagement projection 37 that moves within the engagement bore 35 engages with either a circumferential end portion 35*a* or 35*b* of the engagement bore 35 so that the torque transmission via the connection member 38 is obtainable. As a result, the first and second input members 28A and 28B rotate in such a manner that one of the first and second input members 28A and 28B rotates in the delayed phase relative to the other of the first and second input members 28A and 28B.

Specifically, as illustrated in FIG. 12(*a*), in the handle returning apparatus 31 of the embodiment, the first input member 28A rotates in a counterclockwise direction in FIG. 12(*a*) in a case where the operation handle 20 is operated to rotate in the first direction. At this time, in the connection member 38, each of the engagement projections 37 engages with each of the first circumferential end portions 35*a* of the engagement bores 35 so that the rotation torque in the first direction is transmittable to the second input member 28B. According to the connection mechanism 32 of the embodiment, the second input member 28B rotates in the first direction in the delayed phase corresponding to an angle at which the engagement projection 37 moves within the engagement bore 35 until the engagement projection 37 engages with the first circumferential end portion 35*a*.

On the other hand, as illustrated in FIG. 12(*b*), in a case where the operation handle 20 is operated to rotate in the second direction, the first input member 28A rotates in a clockwise direction in FIG. 12(*b*). At this time, in the connection member 38, each of the engagement projections 37 engages with each of the second circumferential end portions 35*b* of the engagement bores 35 so that the rotation torque in the second direction is transmittable to the second input member 28B. According to the connection mechanism 32 of the embodiment, the second input member 28B rotates in the second direction in the delayed phase corresponding to an angle at which the engagement projection 37 moves within the engagement bore 35 until the engagement projection 37 engages with the second circumferential end portion 35*b*.

As illustrated in FIGS. 6 to 11, the handle returning apparatus 31 of the embodiment includes the spring member 30 that includes a spring body 41 disposed to extend around the rotation shaft 22 that constitutes the support shaft Q2 of the first and second input members 28A and 28B. In the present embodiment, the spring member 30 is formed as a so-called ring spring including the spring body 41 that curves in a substantially arc shape (substantially C-shape). The spring member 30 is disposed between the first input member 28A and the second bracket 23B in the axial direction of the rotation shaft 22.

Figure 7:
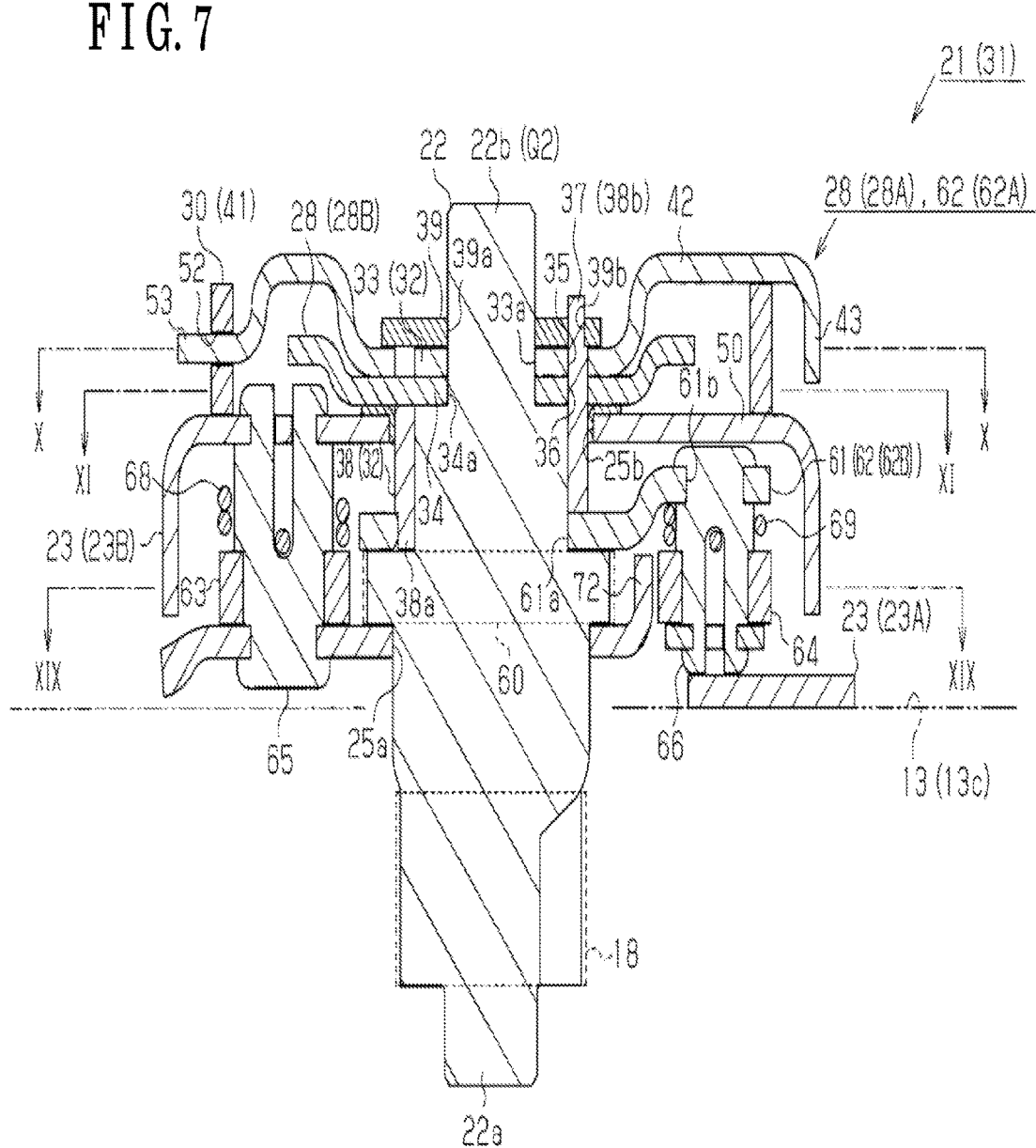
FIG. 7 is a cross-sectional view of the rotation control apparatus according to the first embodiment (cross-sectional view taken along line VII-VII in FIG. 6)
Figure 8:
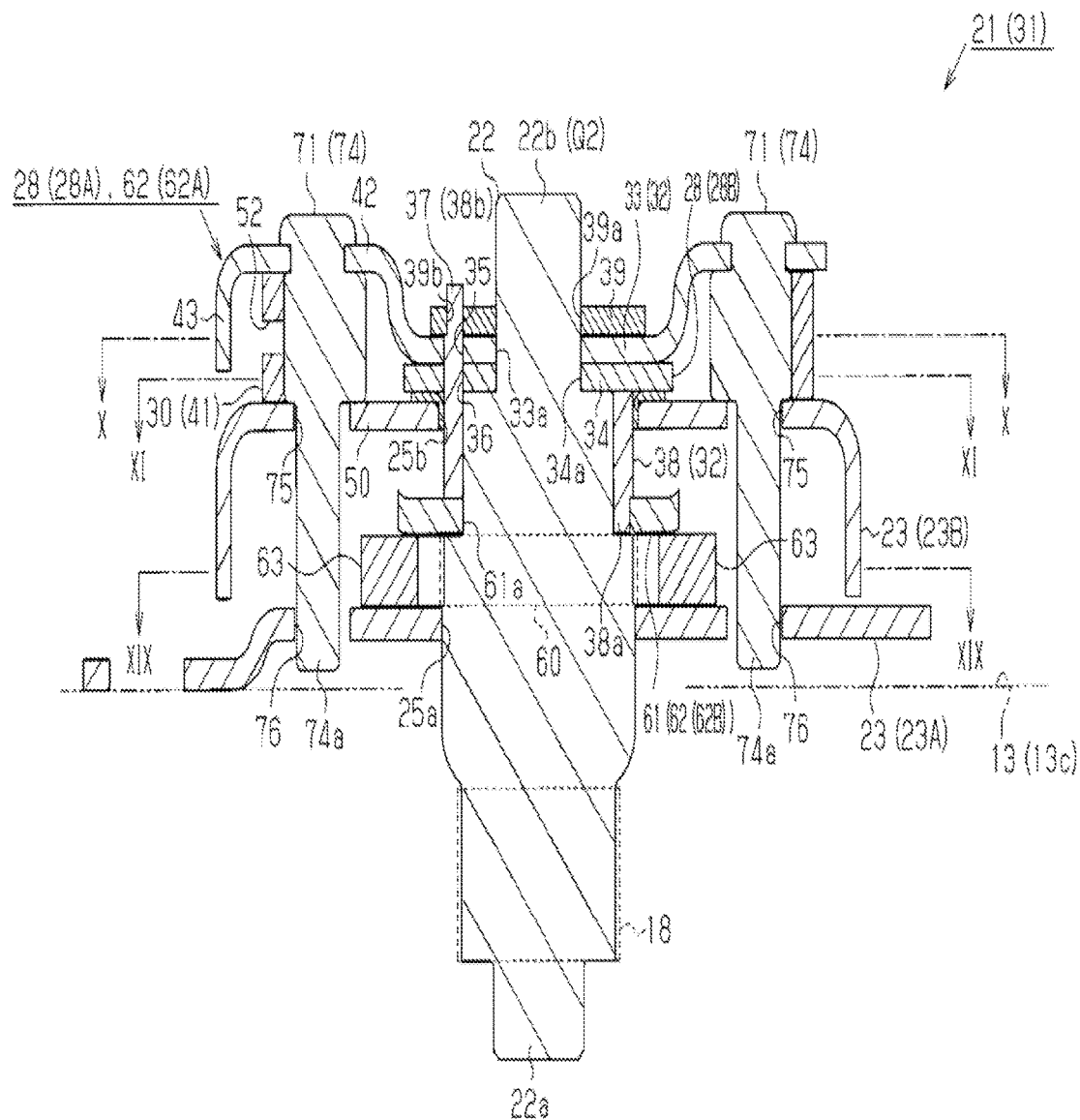
FIG. 8 is a cross-sectional view of the rotation control apparatus according to the first embodiment (cross-sectional view taken along line VIII-VIII in FIG. 6)

In the handle returning apparatus 31 of the embodiment, the first input member 28A includes an annular portion 42 disposed to extend at a radially outer side of the disc portion 33 and plural bending portions 43 projecting from an outer peripheral edge of the annular portion 42 in the axial direction of the rotation shaft 22 towards the second bracket 23B (i.e., downward in FIGS. 7 and 8). In addition, in the first input member 28A of the embodiment, the disc portion 33 and the annular portion 42 are formed in a stepped manner so that the bending portions 43 are disposed at the radially outer side of the disc portion 33. Further, the second input member 28B of the embodiment is smaller in diameter than the first input member 28A so that a radially outer side of the second input member 28B is surrounded by the bending portions 43. The spring member 30 of the embodiment is disposed at an inner side of the bending portions 43 in a state where the spring body 41 of the spring member 30 surrounds the radially outer side of the second input member 28B.

The spring member 30 of the embodiment includes plural engagement portions (56 and 58) which are disposed apart from each other in a circumferential direction of the spring body 41 that includes a substantially C-shape outline. In the embodiment, the second bracket 23B and the first and second input members 28A, 28B include respective engagement projecting portions (47, 48 49 and 53) engageable with the engagement portions (56, 58) of the spring member 30 based on the rotation operation of the operation handle 20.

For example, the spring member 30 of the embodiment includes bending portions 46*a* and 46*b* bending radially inwardly from opposed end portions 41*a* and 41*b* of the spring body 41. Each of the bending portions 46*a* and 46*b* is provided as an end engagement portion 56. The second bracket 23B and the first and second input members 28A, 28B include engagement projecting portions 47 to 49, respectively, which are engageable with the spring member 30 in a state being disposed between the bending portions 46a and 46b.

Figure 9:
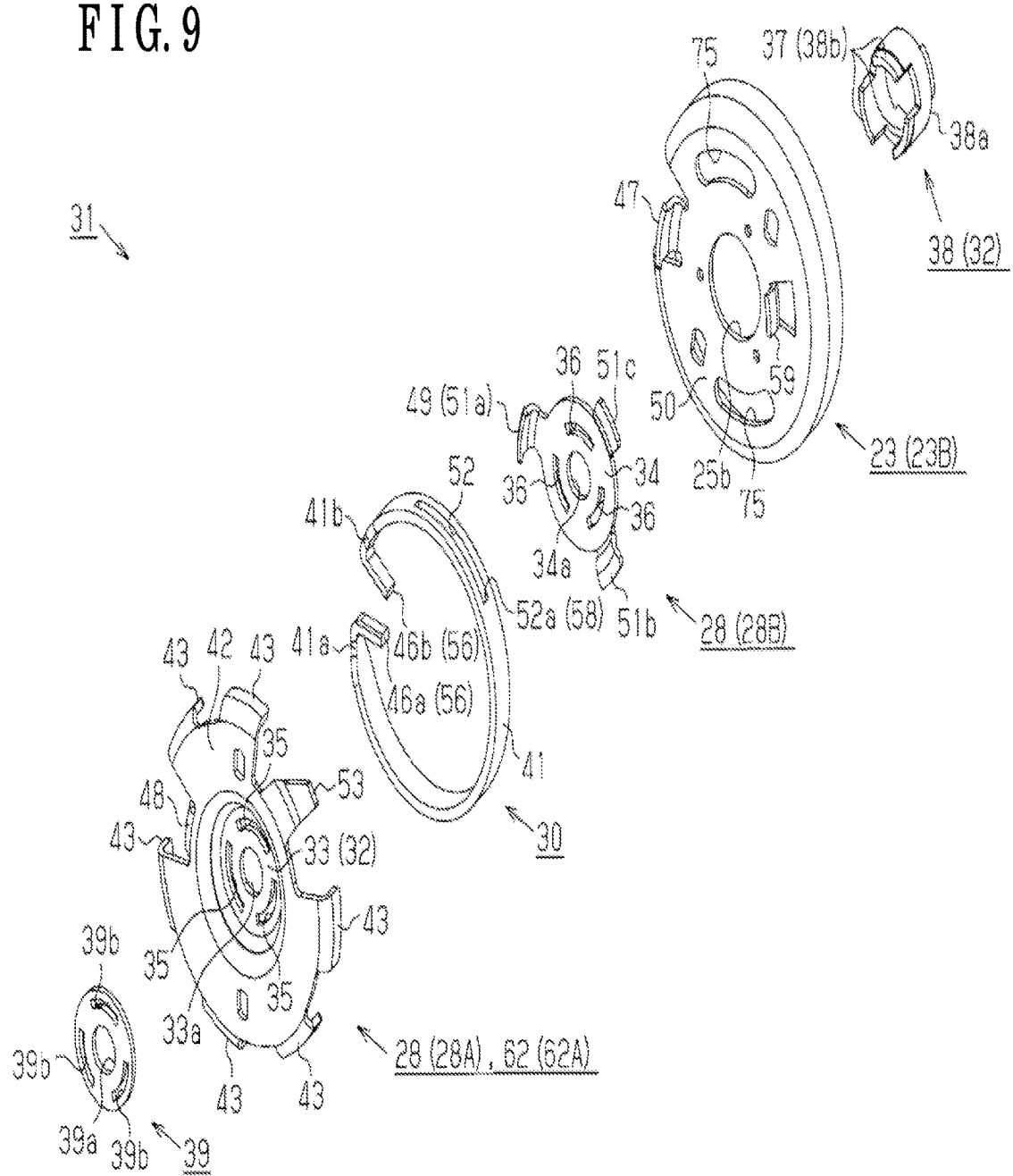
FIG. 9 is an exploded perspective view of a handle returning apparatus according to the first embodiment.

As illustrated in FIG. 9, the engagement projecting portion 47 of the second bracket 23B is formed by bending of a portion of a bracket body 50 towards the first input member 28A, the bracket body 50 including a substantially disc form and facing the annular portion 42 of the first input member 28A. The engagement projecting portion 48 of the first input member 28A is formed by bending of a portion of the annular portion 42 towards the second bracket 23B. The second input member 28B includes plural projecting portions 51a, 51b, and 51c projecting radially outwardly from the disc portion 34. The engagement projecting portion 49 of the second input member 28B is formed by bending of a tip end of the first projecting portion 51a towards the first input member 28A.

As illustrated in FIG. 10, in the embodiment, the engagement projecting portion 47 of the second bracket 23B is disposed at the most radially outer side. The engagement projecting portion 49 of the second input member 28B is disposed at the most radially inner side in a state where the engagement projecting portion 48 of the first input member 28A is disposed between the engagement projecting portions 47 and 49.

As illustrated in FIGS. 9 and 10, a bore portion 52 is provided at the spring body 41 of the spring member 30 to penetrate through the spring body 41 in a radial direction thereof. The bore portion 52 is in an elongated form extending in the circumferential direction of the spring body 41. An engagement projecting portion 53 is provided at the first input member 28A so as to be inserted and positioned within the bore portion 52. In the present embodiment, the engagement projecting portion 53 inserted to be positioned within the bore portion 52 is in engagement with the spring member 30 in a state where a circumferential end portion 52a of the bore portion 52 serves as an intermediate engagement portion 58 provided between the opposed end portions 41a and 41b of the spring body 41.

Figure 13:
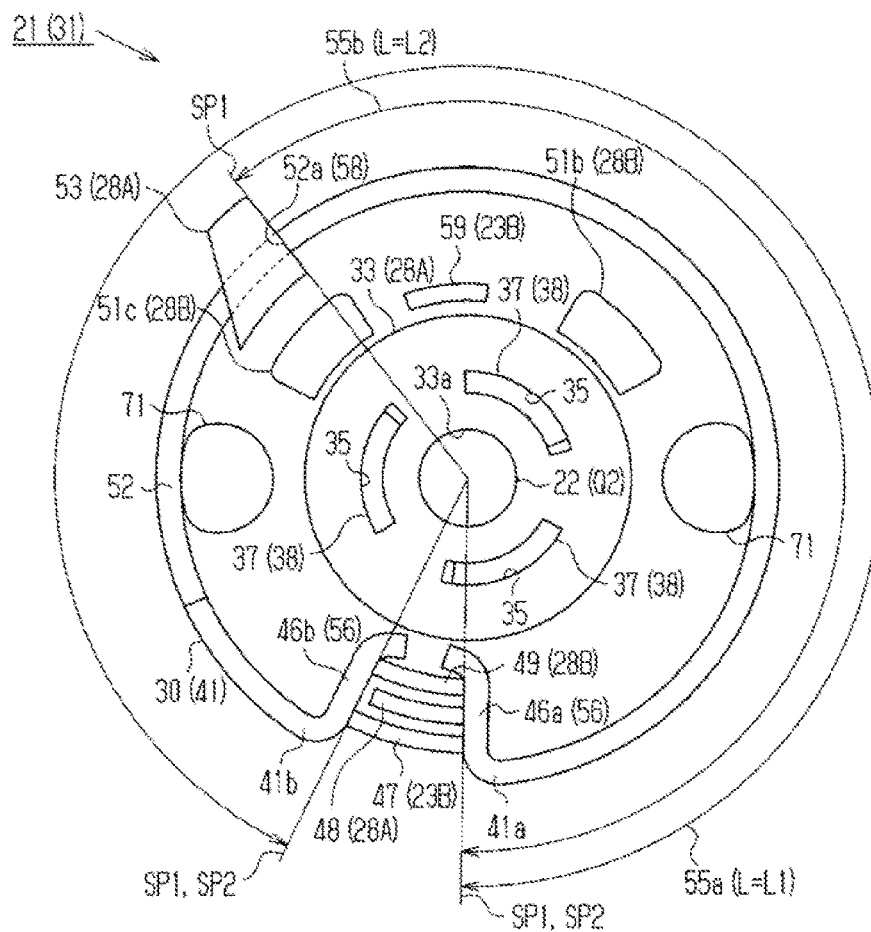
FIG. 13 is an operation explanatory view of the handle returning apparatus according to the first embodiment (neutral position)

That is, as illustrated in FIG. 13, the spring body 41 includes plural (in the embodiment, two) spring portions 55a and 55b. Each of the spring portions 55a and 55b includes given two portions out of the plural engagement portions 56, 58 (46a, 46b, 52a) provided at the spring body 41, the two portions being away from each other in the circumferential direction, as first and second spring end portions SP1 and SP2. In the embodiment, the bending portions 46a and 46b are specified as the first and second spring end portions SP1 and SP2 of the first spring portion 55a. The bending portion 46a and the circumferential end portion 52a are specified as the first and second spring end portions SP1 and SP2 of the second spring portion 55b. Accordingly, the spring portions 55a and 55b include different effective spring lengths L (each length between the spring end portions SP1 and SP2) from each other. In the handle returning apparatus 31 of the embodiment, depending on a direction of the rotation operation input to the operation handle 20, either the first or second spring portion 55a, 55b is configured to generate the returning force for returning the operation handle 20 to the neutral position P0.

Figure 14:
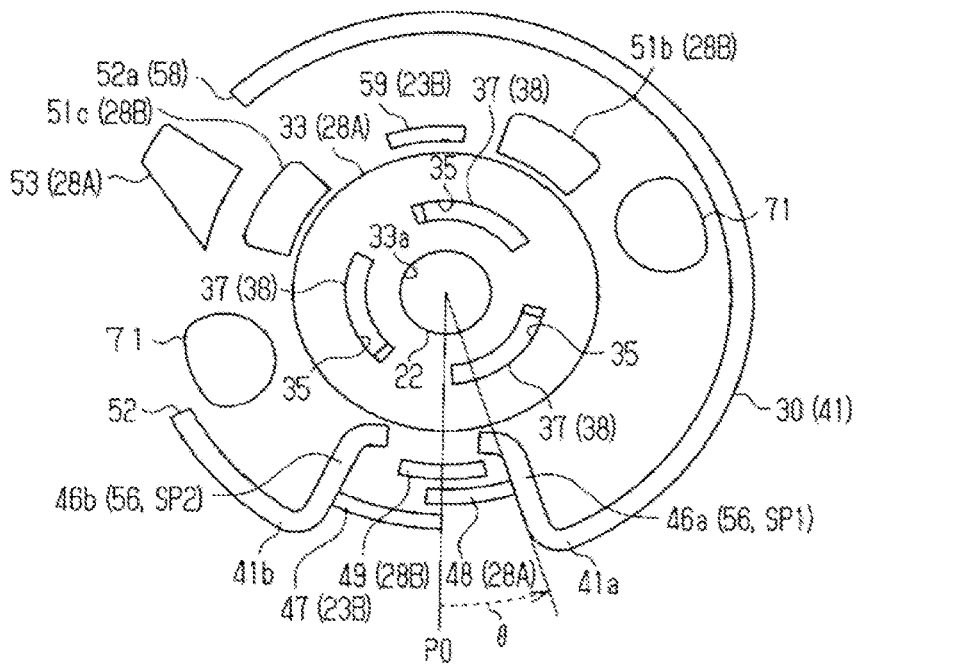
FIG. 14 is an operation explanatory view of the handle returning apparatus according to the first embodiment (rotation operation in a first direction: halfway)
Figure 15:
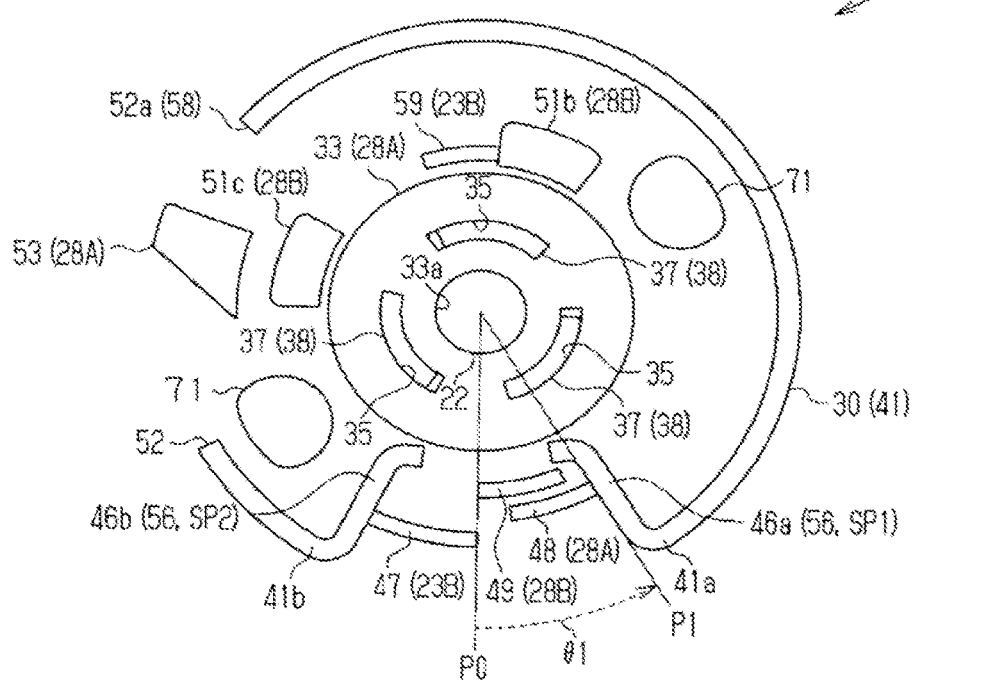
FIG. 15 is an operation explanatory view of the handle returning apparatus according to the first embodiment (rotation operation in the first direction: maximum)

Specifically, as illustrated in FIGS. 14 and 15, in a case where the operation handle 20 is operated in the first direction, the first input member 28A rotates in the counterclockwise direction in FIGS. 14 and 15. At this time, because the rotation position of the first input member 28A relative to the second bracket 23B changes, the engagement projecting portion 47 of the second bracket 23B and the engagement projecting portion 48 of the first input member 28A are separated from each other in the circumferential direction. Accordingly, the engagement projecting portion 47 of the second bracket 23B and the engagement projecting portion 48 of the first input member 28A engage with the respective bending portions 46a and 46b which are provided at the opposed end portions 41a and 41b of the spring body 41 and which serve as the end engagement portions 56.

Specifically, the engagement projecting portion 48 of the first input member 28A that rotates in conjunction with the operation handle 20 engages with the bending portion 46a at the first end portion 41a that is disposed in the counterclockwise direction, i.e., in the first direction, relative to the engagement projecting portion 48. The spring member 30 then attempts to rotate, together with the first input member 28A, in the first direction so that the engagement projecting portion 47 of the second bracket 23B engages with the bending portion 46b at the second end portion 41b of the spring member 30 that attempts to rotate in the first direction. As a result, the spring member 30 is expanded in a state where a portion between the bending portions 46a and 46b constituting the end engagement portions 56 of the spring member 30 are pushed out.

That is, in the embodiment, as illustrated in FIG. 13, in a case where the operation handle 20 is operated to rotate in the first direction, the first spring portion 55a in which the first spring end portion SP1 is obtained by the bending portion 46a at the first end portion 41a of the spring body 41 while the second spring end portion SP2 is obtained by the bending portion 46b at the second end portion 41b is configured to be elastically deformed. Based on the returning force generated by the first spring portion 55a that is elastically deformed, the handle returning apparatus 31 of the embodiment is configured so that the operation handle 20 that is operated in the first direction may be returned to the neutral position P0.

Figure 16:
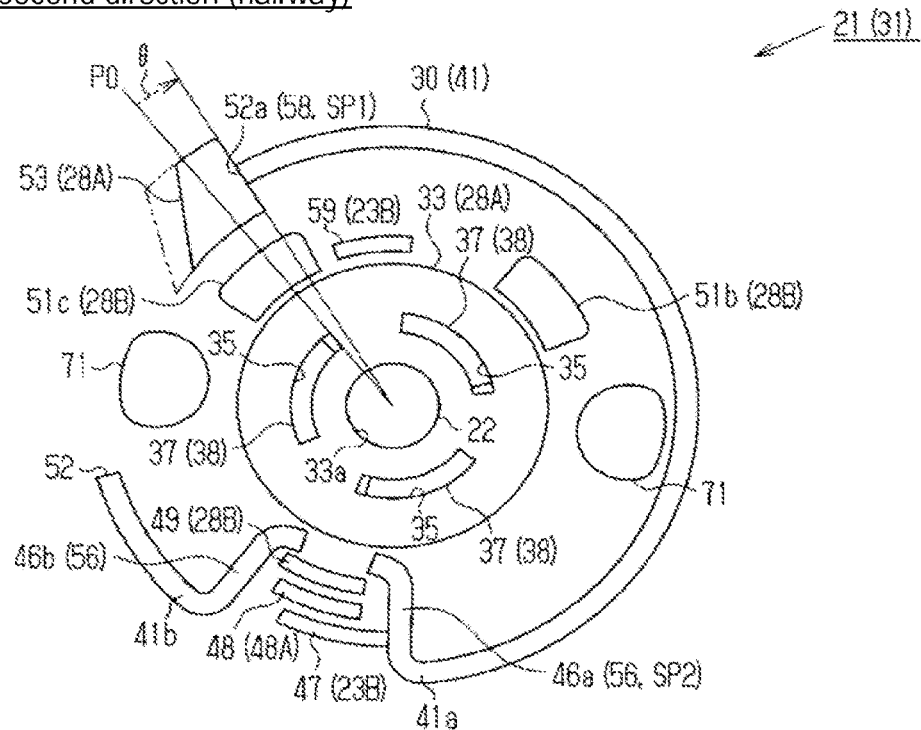
FIG. 16 is an operation explanatory view of the handle returning apparatus according to the first embodiment (rotation operation in a second direction: halfway)
Figure 17:
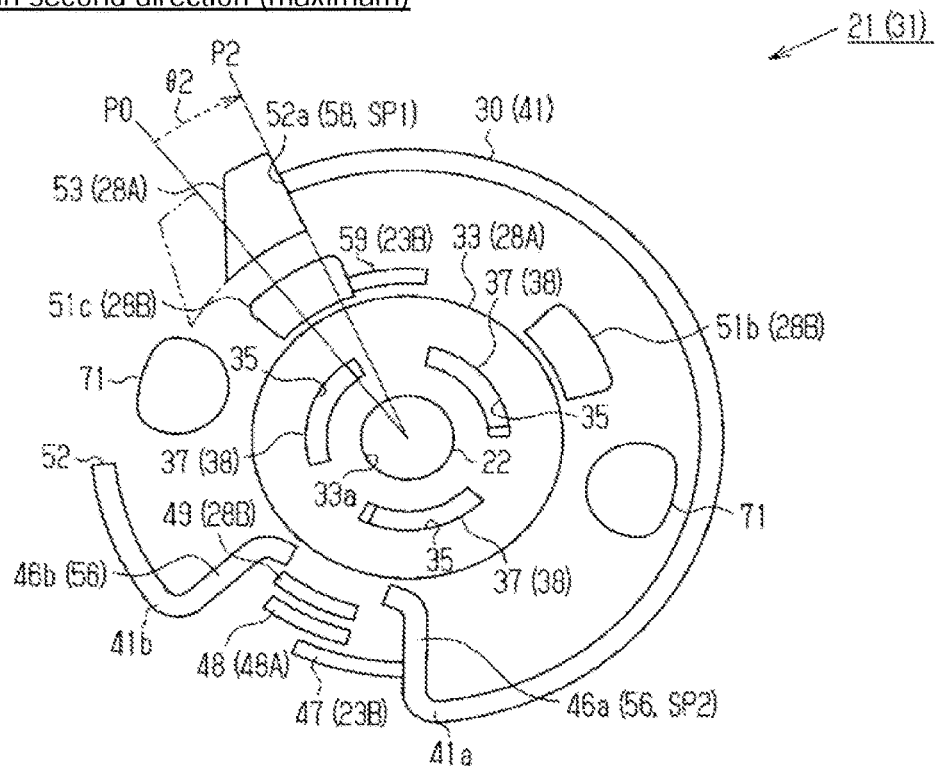
FIG. 17 is an operation explanatory view of the handle returning apparatus according to the first embodiment (rotation operation in the second direction: maximum)

On the other hand, as illustrated in FIGS. 16 and 17, in a case where the operation handle 20 is operated in the second direction, the first input member 28A rotates in the clockwise direction in FIGS. 16 and 17. At this time, in the embodiment, the engagement projecting portion 53 provided at the first input member 28A engages with the bore portion 52 provided at the spring body 41, specifically, engages with the spring member 30 which includes the circumferential end portion 52a of the bore portion 52 as the intermediate engagement portion 58, the circumferential end portion 52a being positioned in the second direction. The spring member 30 thus attempts to rotate, together with the first input member 28A, in the second direction so that the engagement projecting portion 47 of the second bracket 23B engages with the bending portion 46a at the first end portion 41a of the spring member 30 that attempts to rotate in the second direction.

That is, in the embodiment, as illustrated in FIG. 13, in a case where the operation handle 20 is operated to rotate in the second direction, the second spring portion 55b in which the first spring end portion SP1 is obtained by the circumferential end portion 52a of the bore portion 52 serving as the intermediate engagement portion 58 while the second spring end portion SP2 is obtained by the bending portion 46a at the first end portion 41a serving as the end engagement portion 56 is configured to be elastically deformed. Based on the returning force generated by the second spring portion 55b that is elastically deformed, the handle returning apparatus 31 of the embodiment is configured so that the operation handle 20 that is operated in the second direction may be returned to the neutral position P0.

In the embodiment, in a case where the operation handle 20 is arranged at the neutral position P0, circumferentially opposed ends of the engagement projecting portion 47 of the second bracket 23B and circumferentially opposed ends of the engagement projecting portion 49 of the second input member 28B are configured to be disposed and sandwiched between the bending portions 46a and 46b of the spring member 30.

That is, even in a case where the operation handle 20 is not operated, the first spring portion 55a in which the first and second spring end portions SP1 and SP2 are obtained by the opposed end portions 41a and 41b of the spring body 41 at which the respective bending portions 46a and 46b serving as the end engagement portions 56 are provided is configured to generate the returning force. Accordingly, the handle returning apparatus 31 of the embodiment is configured so that the relative rotation position between the second bracket 23B and the first and second input members 28A, 28B is specified in a case where the operation handle 20 is at the neutral position P0.

Specifically, in a case where the operation handle 20 is arranged at the neutral position P0, the handle returning apparatus 31 of the embodiment is configured to specify the relative rotation position between the first and second input members 28A and 28B so that, within each of the engagement bores 35 constituting the connection mechanism 32, the engagement projection 37 is separated from the first circumferential end portion 35a with which the engagement projection 37 engages at the time of the rotation operation of the operation handle 20 in the first direction. Accordingly, the second input member 28B securely rotates in the delayed phase relative to the first input member 28A to which the operation handle 20 is fixed in a case where the operation handle 20 is operated to rotate in the first direction (see FIGS. 12(a) and 12(b)).

Further, in the embodiment, as illustrated in FIG. 3, in a case where a maximum operation amount α1 (pull-up position P1) of the operation handle 20 generated when the operation handle 20 is operated to rotate in the first direction and a maximum operation amount α2 (pull-down position P2) of the operation handle 20 generated when the operation handle 20 is operated to rotate in the second direction are compared, the maximum operation amount α2 at the time of the rotation operation in the second direction is smaller.

On the basis of the aforementioned point, in the spring member 30 of the embodiment, the first and second spring portions 55a and 55b to which different spring forces are specified on a basis of different effective spring lengths L1 and L2 are integrally formed. According to the handle returning apparatus 31 of the embodiment, the first spring portion 55a generates the returning force in a case where the operation handle 20 is operated to rotate in the first direction while the second spring portion 55b generates the returning force in a case where the operation handle 20 is operated to rotate in the second direction. As a result, an appropriate returning force is applicable to the operation handle 20 depending on the direction of rotation operation of the operation handle 20.

Specifically, as illustrated in FIG. 13, in comparison between the first and second spring portions 55a and 55b, the effective spring length L2 of the second spring portion 55b in which one of the spring end portions SP1 and SP2 is obtained by the intermediate engagement portion 58 is shorter than the effective spring length L1 of the first spring portion 55a in which the spring end portions SP1 and SP2 are obtained by the two end engagement portions 56 (i.e., L=L2<L1). Accordingly, it is configured that the second spring portion 55b includes a greater spring force (spring constant) than the first spring portion 55a. That is, in a case where the first spring portion 55a serves as a base spring portion, the second spring portion 55b serves as a reinforced spring portion that may generate a greater returning force depending on an elastic deformation amount in the circumferential direction.

Figure 18:
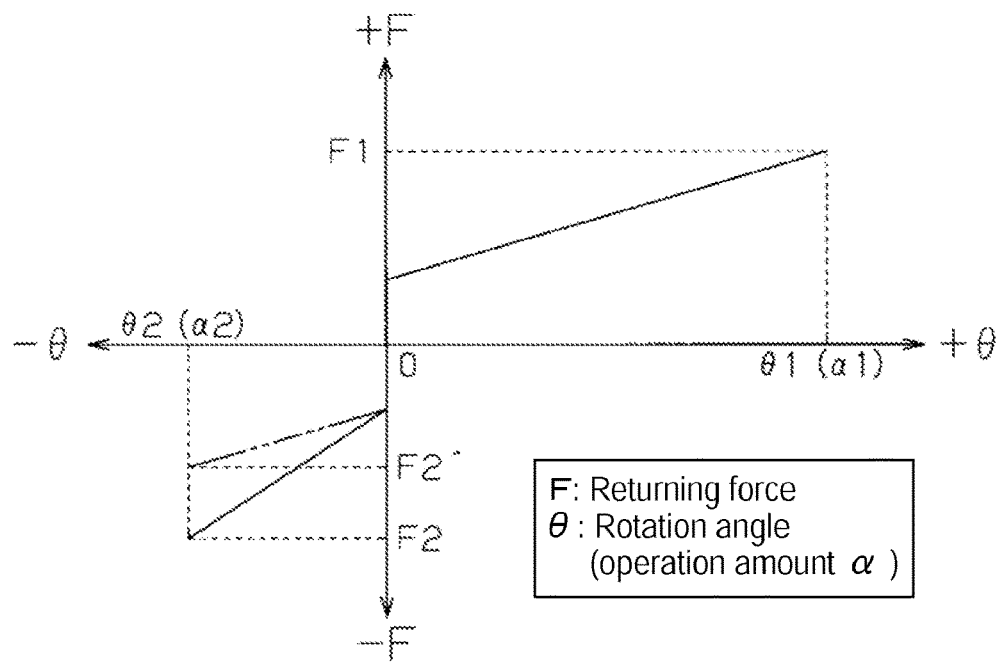
FIG. 18 is an operation explanatory view of the handle returning apparatus according to the first embodiment.

As illustrated in FIG. 18, the handle returning apparatus 31 of the embodiment is configured so that a substantially equal returning force F (F1, F2) for returning the operation handle 20 to the neutral position P0 is obtained in a case where the operation handle 20 is operated in any of the first direction and the second direction (F1≈F2) by utilizing a difference in spring forces between the first spring portion 55a and the second spring portion 55b. Accordingly, a favorable operation performance of the operation handle 20 is ensured and a returning performance of the operation handle 20 to the neutral position P0 is enhanced. As a result, the seat lifter apparatus 10 guarantees secure operations of components operating in conjunction with the handle returning apparatus 31.

Rotation angles θ1 and θ2 in FIG. 18 are maximum values of a rotation angle θ generated in a case where the operation handle 20 is operated to rotate in the first direction and the second direction respectively in a state where the rotation angle of the first input member 28A which rotates on the basis of the rotation operation of the operation handle 20 is specified to be "θ" (see FIGS. 15 and 17). "F2" in FIG. 18 is a maximum value in a case where the operation handle 20 is returned to the neutral position P0 based on the returning force F generated by the first spring portion 55a even when the operation handle 20 is operated in the second direction (known configuration).

In the embodiment, as illustrated in FIGS. 9 to 11, and 13 to 17, the second bracket 23B includes a stopper portion 59 projecting towards the first input member 28A in a state where the stopper portion 59 is positioned at a radially outer side of the second input member 28B, specifically, of the disc portion 34 thereof. The stopper portion 59 is formed by cutting a portion of the bracket body 50 and bending the cut portion towards the first input member 28A. In the embodiment, either the second projecting portion 51b or the third projecting portion 51c projecting radially outwardly from the disc portion 34 makes contact with the stopper portion 59 to thereby restrict the rotation of the second bracket 23B. That is, the maximum operation amount α1 of the operation handle 20 generated in a case where the operation handle 20 is operated to rotate in the first direction and the maximum operation amount α2 of the operation handle 20 generated in a case where the operation handle 20 is operated to rotate in the second direction (see FIG. 3) are specified.

Next, components of the rotation control apparatus 21 operating in conjunction with the handle returning apparatus 31 are explained. As illustrated in FIGS. 5, 7, 8, and 19, the rotation control apparatus 21 of the embodiment includes a ratchet wheel 60 integrally rotating with the pinion gear 18 while the ratchet wheel 60 shares the rotation shaft 22 with the pinion gear 18. In the embodiment, the ratchet wheel 60, which includes a known configuration by including plural engagement teeth at an outer periphery, is integrally provided with the rotation shaft 22. The pinion gear 18 is also integrally provided with the rotation shaft 22. The ratchet wheel 60 is disposed between the first bracket 23A and the second bracket 23B in the axial direction of the rotation shaft 22.

An operation plate 61 is disposed between the second bracket 23B and the ratchet wheel 60 in the axial direction of the rotation shaft 22 so as to be rotatably supported, in the same way as the first and second input members 28A and 28B, by the rotation shaft 22 serving as the support shaft Q2. In the embodiment, the operation plate 61 is formed by deformation processing (press-working) of a metallic plate. The operation plate 61 includes a through-hole 61a penetrating through the operation plate 61 in a thickness direction thereof. The operation plate 61 is rotatably supported by the rotation shaft 22 in a state where the rotation shaft 22 is inserted to be positioned within the through-hole 61a.

Figure 20:
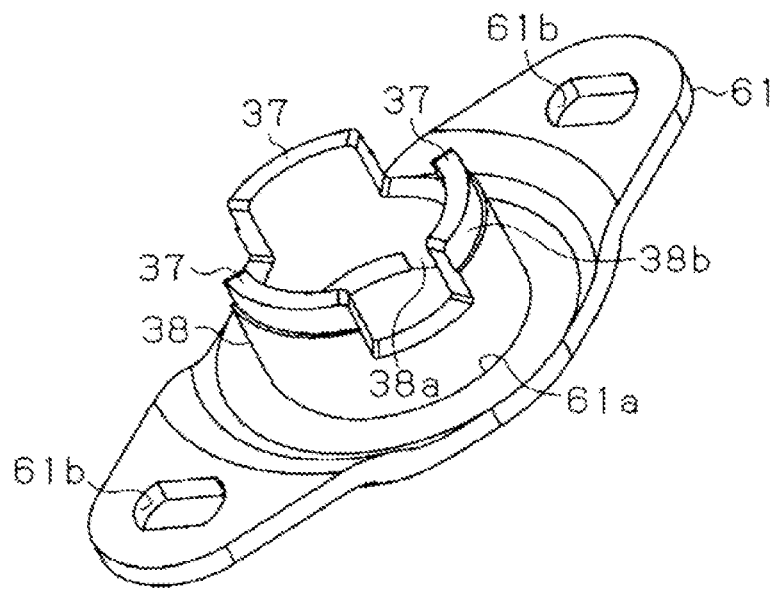
FIG. 20 is a perspective view of an operation plate that constitutes a second operation member and a connection member that constitutes the connection mechanism.

In the embodiment, as illustrated in FIGS. 7, 8 and 20, the operation plate 61 is connected to a first end portion 38a of the connection member 38 constituting the connection mechanism 32 that connects between the first input member 28A and the second input member 28B so that the torque transmission is obtainable therebetween. The first end portion 38a, which is substantially formed in a cylinder, of the connection member 38 is fitted in the through-hole 61a of the operation plate 61 so that the operation plate 61 is connected to the connection member 38 to be relatively non-rotatable. Accordingly, the operation plate 61 rotates in the delayed phase relative to the first input member 28A that rotates in conjunction with the operation handle 20.

That is, in the embodiment, the first input member 28A fixed to the operation handle 20 constitutes a first operation member 62A while the operation plate 61 fixed to the second input member 28B constitutes a second operation member 62B rotating in the delayed phase relative to the first input member 28A. Based on a relative position change between an operation member 62 (62A, 62B) and the bracket 23 (23A, 23B) generated by the rotation operation of the operation handle 20, the rotation control apparatus 21 of the embodiment is configured to control the rotation of the pinion gear 18 of which the rotation shaft 22 is supported by the bracket 23.

Figure 5:
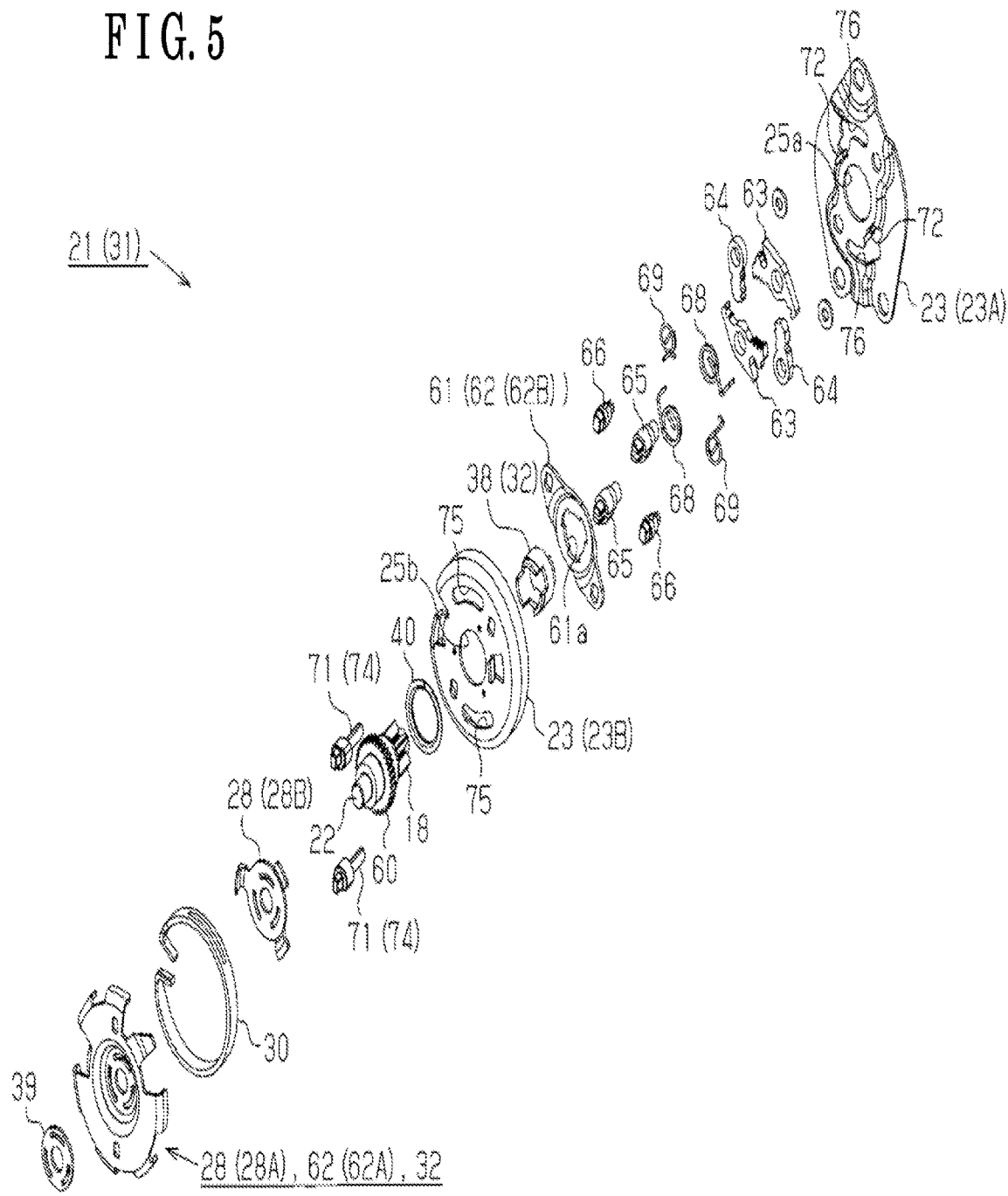
FIG. 5 is an exploded perspective view of the rotation control apparatus according to a first embodiment.
Figure 6:
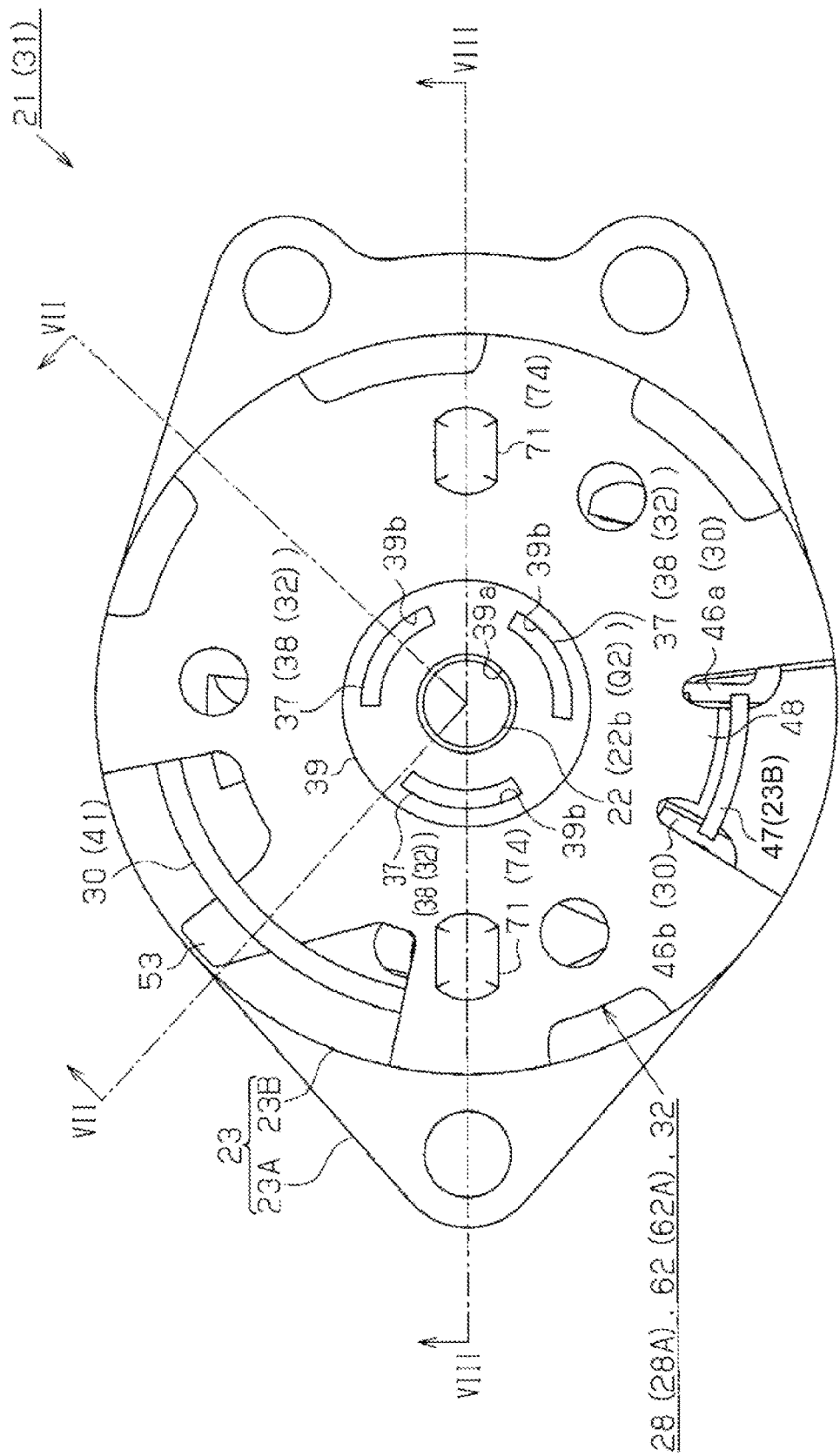
FIG. 6 is a side view of the rotation control apparatus.
Figure 19:
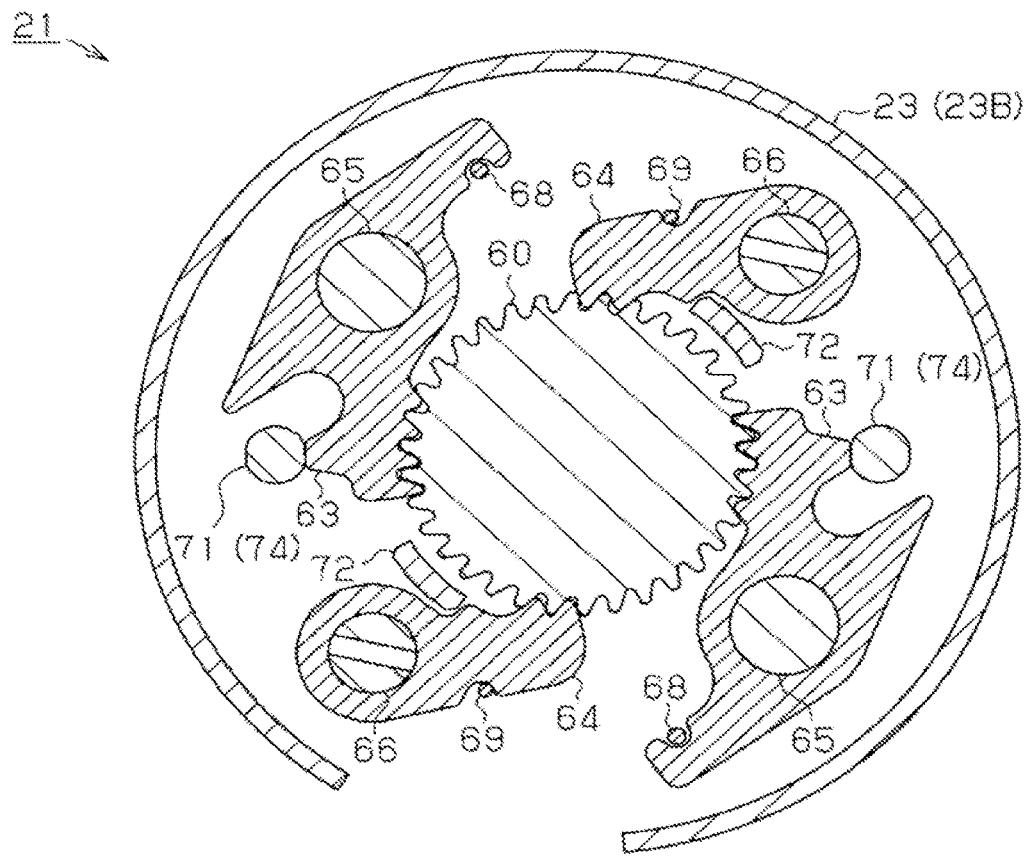
FIG. 19 is a cross-sectional view of the rotation control apparatus (cross-sectional view taken along line XIX-XIX in FIG. 7)

As illustrated in FIGS. 5, 7, and 19, the rotation control apparatus 21 of the embodiment includes plural (in the embodiment, two) engagement levers 63. The engagement levers 63 are configured to restrict the rotation of the pinion gear 18 in a direction where the seat 1 moves downward (i.e., in a direction where the ratchet wheel 60 rotates in the clockwise direction FIG. 19) in a state where the engagement levers 63 engage with the ratchet wheel 60. The rotation control apparatus 21 of the embodiment further includes plural (in the embodiment, two) drive levers 64. The drive levers 64 are configured to drive the pinion gear 18 to rotate in a direction where the seat 1 moves upward on a basis of the rotation operation of the operation handle 20 in the first direction which is input to the operation handle 20 in a state where the drive levers 64 integrally rotate with the second operation member 62B while engaging with the ratchet wheel 60.

The rotation control apparatus 21 of the embodiment includes plural (in the embodiment, two) support shafts 65 extending substantially parallel to the rotation shaft 22 in a state where opposed ends of each of the support shafts 65 are supported by the first bracket 23A and the second bracket 23B respectively. In addition, in the embodiment, the two support shafts 65 are provided around the ratchet wheel 60 at even intervals (at 180-degree intervals in the circumferential direction). The engagement levers 63 are rotatably provided at the radially outer side of the ratchet wheel 60 in a state where the engagement levers 63 are supported by the respective support shafts 65.

The rotation control apparatus 21 of the embodiment also includes plural (in the embodiment, two) support shafts 66 extending substantially in parallel to the rotation shaft 22 towards the first bracket 23A in a state where one end of each of the support shafts 66 is fixed to the operation plate 61 that constitutes the second operation member 62B. In the embodiment, the support shafts 66 are also provided around the ratchet wheel 60 at even intervals (at 180-degree intervals in the circumferential direction).

In the embodiment, the support shafts 66 are fixed to the operation plate 61 in a state where one axial end of each of the support shafts 66 is fitted to a fitting bore 61b (see FIG. 20) provided at the operation plate 61.

In a state where the operation handle 20 is returned to the neutral position P0 as illustrated in FIG. 19, each of the support shafts 66 is arranged to be displaced by approximately 90 degrees relative to each of the support shafts 65 provided at the bracket 23 (23A, 23B) in the circumferential direction. The drive levers 64 are rotatably provided at the radially outer side of the ratchet wheel 60 in a state where the drive levers 64 are supported by the respective support shafts 66.

Figure 21:
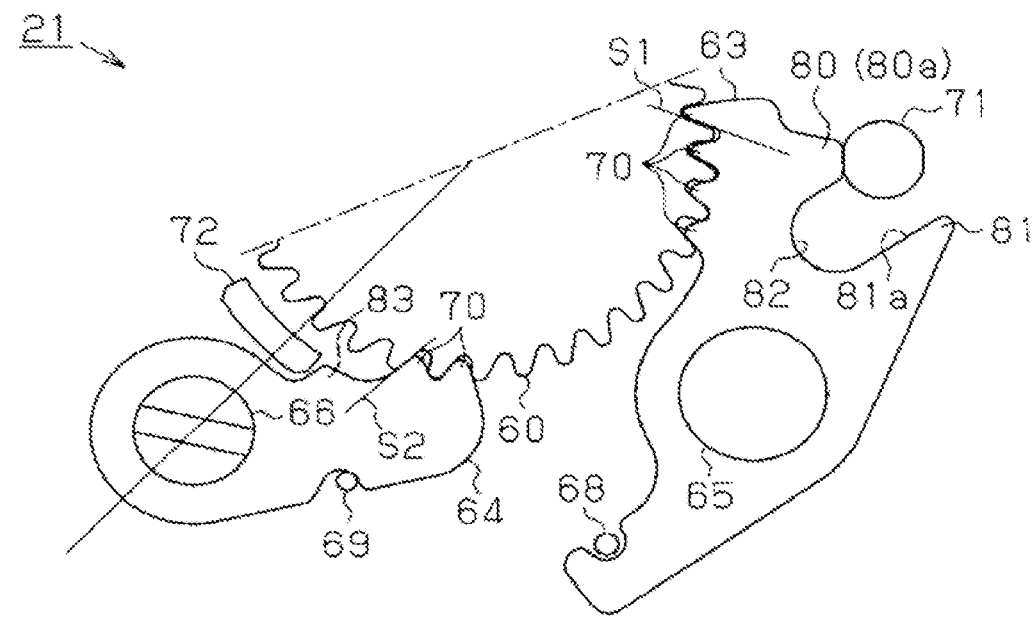
FIG. 21 is an operation explanatory view of the rotation control apparatus (neutral position)

Further, in the embodiment, torsion coil springs 68 serving as biasing members are fitted to the respective support shafts 65 while torsion coil springs 69 serving as the biasing members are fitted to the respective support shafts 66. As illustrated in FIG. 21, each of the engagement levers 63 and each of the drive levers 64 are biased to rotate in a direction where engagement teeth 70 provided at an end of the engagement lever 63 and at an end of the drive lever 64 engage with (engagement teeth of) the ratchet wheel 60 (i.e., in the counterclockwise direction in FIG. 19) based on elastic forces of the torsion coil springs 68 and 69.

Here, in the embodiment, each of the support shafts 65 at the engagement lever 63 is disposed at a side where the support shaft 65 restricts the rotation of the ratchet wheel 60 in the clockwise direction in FIG. 21 in a substantially normal direction intersecting with an engagement surface S1 between the engagement teeth 70 of the engagement lever 63 and (the engagement teeth of) the ratchet wheel 60. A pressure angle is defined for restricting the rotation of the ratchet wheel 60 in the clockwise direction in FIG. 21, i.e., the rotation of the pinion gear 18 in a direction where the seat 1 moves downward.

In the same manner, each of the support shafts 66 at the drive lever 64 is disposed at a side where the support shaft 66 restricts the rotation of the ratchet wheel 60 in the clockwise direction in FIG. 21 in a substantially normal direction intersecting with an engagement surface S2 between the engagement teeth 70 of the drive lever 64 and the ratchet wheel 60. A pressure angle is defined for driving and rotating the ratchet wheel 60 in the counterclockwise direction in FIG. 21.

As mentioned above, in the embodiment, the first operation member 62A and the second operation member 62B rotate in the counterclockwise direction in FIG. 13 based on the rotation operation of the operation handle 20 in the first direction for pulling up the operation handle 20 (see FIG. 3). At this time, the drive levers 64 of the embodiment integrally rotate with the operation plate 61 constituting the second operation member 62B so as to move, together with the support shafts 66, along the outer periphery of the ratchet wheel 60 in the counterclockwise direction in FIG. 19. Accordingly, the drive levers 64 of the embodiment may drive the ratchet wheel 60 in engagement with the drive levers 64 to rotate in the counterclockwise direction in FIG. 19, i.e., in a direction where the seat 1 moves upward.

In the embodiment, in a case where the ratchet wheel 60 rotates in an opposite direction from the direction in which the rotation of the ratchet wheel 60 is restricted, i.e., in a direction where the seat 1 moves upward, the engagement teeth 70 of each of the engagement levers 63 are configured to slide or slip on the engagement surface S1 between the engagement teeth 70 of the engagement lever 63 and (the engagement teeth of) the ratchet wheel 60. In the same way, in a case where the drive levers 64 circumferentially move in an opposite direction (clockwise direction in FIG. 19) from the direction in which the drive levers 64 drive and rotate the ratchet wheel 60, the engagement teeth 70 of each of the drive levers 64 are configured to slide or slip on the engagement surface S2 between the engagement teeth 70 of the drive lever 64 and (the engagement teeth of) the ratchet wheel 60. Accordingly, ratchet mechanisms are constituted between the ratchet wheel 60 and each of the engagement levers 63 and between the ratchet wheel 60 and each of the drive levers 64.

As illustrated in FIGS. 5, 8, and 19, the rotation control apparatus 21 of the embodiment includes engagement lever control pieces 71 and drive lever control pieces 72. Each of the engagement lever control pieces 71 releases the engagement of each of the engagement levers 63 relative to the ratchet wheel 60 based on the rotation operation of the operation handle 20 in the second direction for pulling down the operation handle 20. Each of the drive lever control pieces 72 releases the engagement of each of the drive levers 64 relative to the ratchet wheel 60.

The engagement lever control pieces 71 and the drive lever control pieces 72 are configured so that a relative position of each of the engagement lever control pieces 71 relative to the corresponding engagement lever 63 serving as a control target of the engagement lever control piece 71 and a relative position of each of the drive lever control pieces 72 relative to the corresponding drive lever 64 serving as a control target of the drive lever control piece 72 are changed in the circumferential direction in a case where the first and second operation members 62A, 62B and the bracket 23 (23A, 23B) rotate relative to each other on the basis of the rotation operation input to the operation handle 20. In a case where the operation handle 20 is operated to rotate in the second direction, the engagement lever control pieces 71 and the drive lever control pieces 72 press the engagement levers 63 and the drive levers 64 respectively, thereby rotating the engagement levers 63 and the drive levers 64 in a direction to disengage from the ratchet wheel 60 (in the clockwise direction in FIG. 19).

As illustrated in FIGS. 5 and 8, each of the engagement lever control pieces 71 includes an axial member 74 fixed to the first input member 28A which constitutes the first operation member 62A. A tip end 74a of the axial member 74 projects in the axial direction of the rotation shaft 22 towards the first bracket 23A (i.e., downward in FIG. 8). In the embodiment, the bracket body 50 of the second bracket 23B includes plural elongated bores 75 extending in the circumferential direction. The engagement lever control pieces 71 are inserted to be positioned within the respective elongated bores 75 so as to integrally rotate with the first operation member 62A without interfering with the second bracket 23B.

The first bracket 23A also includes plural elongated bores 76 extending in the circumferential direction in the same way as the elongated bores 75 provided at the bracket body 50. Tip ends of the engagement lever control pieces 71 (i.e., the tip ends 74a of the axial members 74) are inserted to be positioned within the respective elongated bores 76. As a result, based on the relative rotation of the first operation member 62A relative to both the brackets 23A and 23B, the engagement lever control pieces 71 move in the circumferential direction at the radially outer side of the ratchet wheel 60 in a state being guided by the respective elongated bores 76.

As illustrated in FIGS. 5, 8, and 19, the drive lever control pieces 72 are provided at the first bracket 23A. For example, each of the drive lever control pieces 72 is formed by cutting a portion of the first bracket 23A and bending the cut portion towards the second bracket 23B so that a tip end of the drive lever control piece 72 projects towards the second bracket 23B (i.e., upward in FIG. 8). In addition, in the embodiment, each of the drive lever control pieces 72 is disposed between the ratchet wheel 60 and each of the support shafts 66 of the drive levers 64 at the radially outer side of the ratchet wheel 60. Accordingly, the drive levers 64 are configured to move in the circumferential direction at the radially outer side than the drive lever control pieces 72 based on the relative rotation of the second operation member 62B relative to both the brackets 23A and 23B.

As illustrated in FIG. 19, the engagement lever control pieces 71 of the embodiment are configured to make contact with the respective engagement levers 63 that are in engagement with the ratchet wheel 60 in a case where the operation handle 20 is arranged at the neutral position P0. Accordingly, the engagement lever control pieces 71 restrict the operation of each of the engagement levers 63 disengaging from the ratchet wheel 60, i.e., the rotation of the engagement lever 63 in the clockwise direction in FIG. 19, to thereby restrict the rotation of the pinion gear 18 in the direction where the seat 1 moves upward.

For example, as illustrated in FIG. 21, each of the engagement levers 63 of the embodiment includes a restricting projection 80 projecting radially outwardly relative to the ratchet wheel 60 in the engagement state with the ratchet wheel 60. In a case where the operation handle 20 is arranged at the neutral position P0, each of the engagement lever control pieces 71 makes contact with an end 80a of the restricting projection 80.

Figure 22:
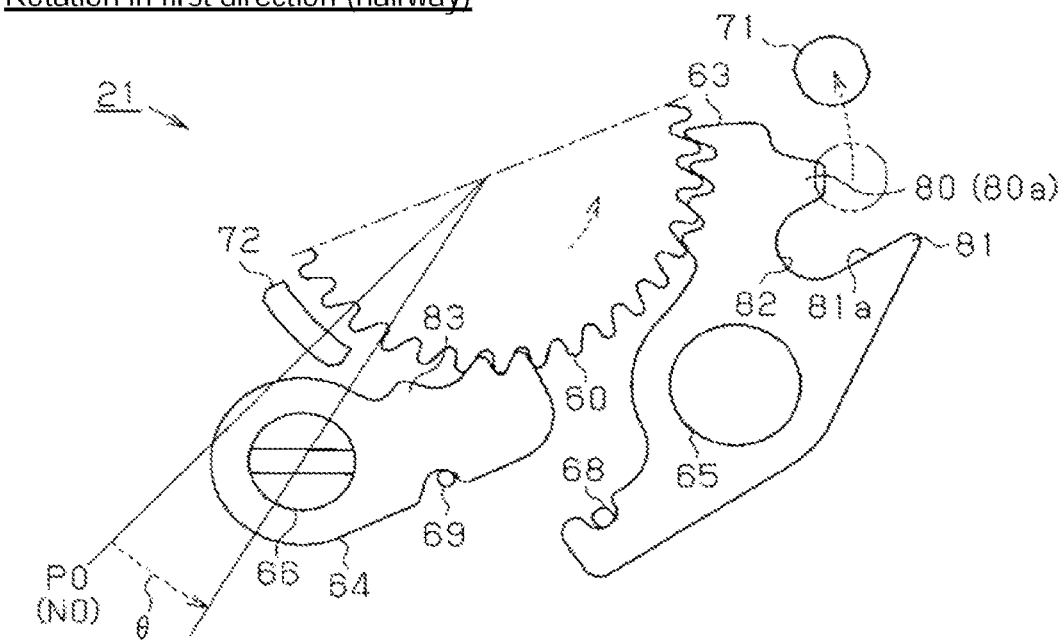
FIG. 22 is an operation explanatory view of the rotation control apparatus (rotation operation in the first direction: halfway)

As illustrated in FIG. 22, each of the engagement lever control pieces 71 circumferentially moves in the counterclockwise direction in FIG. 22 at the radially outer side of the ratchet wheel 60 by integrally rotating with the first operation member 62A in a case where the operation handle 20 is operated in the first direction for pulling up the operation handle 20. Then, the engagement lever control piece 71 separates from the end 80a of the restricting projection 80 so that the rotation of each of the engagement levers 63 is permitted. That is, in a case where the pinion gear 18 rotates in the direction where the seat 1 moves upward in conjunction with the rotation operation of the operation handle 20 in the first direction, each of the engagement levers 63 which disengages from the ratchet wheel 60 is allowed to rotate.

At this time, in the embodiment, the first operation member 62A rotates prior to the second operation member 62B. That is, the second operation member 62B (see FIG. 7) at which the support shafts 66 of the drive levers 64 are provided is brought to a state in which the rotation torque in the first direction is transmitted to the second operation member 62B by the engagement of the engagement projections 37 of the connection member 38 constituting the connection mechanism 32 with the first circumferential end portions 35a of the first engagement bores 35 provided at the first operation member 62A (first input member 28A) (see FIG. 12(a)). Accordingly, the second operation member 62B rotates in the delayed phase relative to the first operation member 62A so that, after each of the engagement lever control pieces 71 separates from each of the restricting projections 80 of the engagement levers 63 as illustrated in FIG. 22, each of the drive levers 64 that integrally rotates with the second operation member 62B drives and rotates the ratchet wheel 60.

Figure 23:
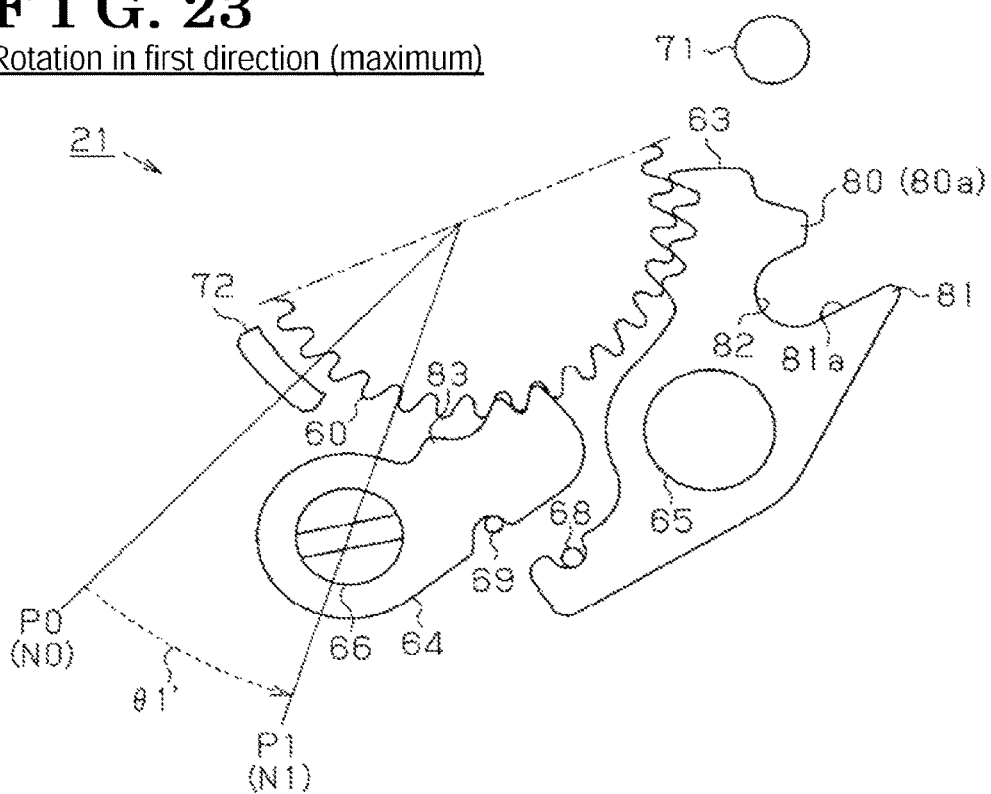
FIG. 23 is an operation explanatory view of the rotation control apparatus (rotation operation in the first direction: maximum)

In the embodiment, as illustrated in FIG. 23, each of the drive levers 64 circumferentially moves in the counterclockwise direction in FIG. 23 from a position N0 corresponding to the neutral position P0 to a position N1 corresponding to the pull-up position P1 (rotation angle θ1') in a case where the operation handle 20 is operated to rotate from the neutral position P0 to the pull-up position P1 (see FIG. 3). Accordingly, by one time operation of pulling-up the operation handle 20 by a user, the pinion gear 18 which shares the rotation shaft 22 with the ratchet wheel 60 may be driven to rotate by an amount corresponding to two pieces of the engagement teeth of the ratchet wheel 60.

At a time of a return operation of the operation handle 20 for returning the operation handle 20, which is pulled up, to the neutral position P0, the rotation of the pinion gear 18 in the direction in which the seat 1 moves downward is restricted by the engagement levers 63 engaging with the ratchet wheel 60. At this time, because the drive levers 64 circumferentially move in the opposite direction from the direction for driving and rotating the ratchet wheel 60, the operation of each of the drive levers 64 disengaging from the ratchet wheel 60 is permitted. Accordingly, while maintaining the rotation position (corresponding to the two pieces of the engagement teeth) of the ratchet wheel 60 that is driven to rotate by one-time operation of pulling up the operation handle 20, each of the drive levers 64 returns to the position N0 corresponding to the neutral position P0 from the position N1 corresponding to the pull-up position P1.

In the embodiment, as illustrated in FIG. 21, each of the engagement levers 63 includes a pressing projection 81 projecting further radially outwardly of the ratchet wheel 60 than the restricting projection 80. That is, each of the engagement lever control pieces 71 may be in contact with each of the engagement levers 63 in a case where the engagement lever control piece 71 is arranged at a specific movement position, i.e., in a limited case where the operation handle 20 is arranged at the neutral position P0, by the contact of the engagement lever control piece 71 with the end 80a of the restricting projection 80 projecting radially outwardly of the ratchet wheel 60. Nevertheless, on the other hand, in a case where the operation handle 20 is positioned at other than the neutral position P0, there is an issue that the engagement lever control piece 71 may be difficult to make contact with the engagement lever 63.

Figure 24:
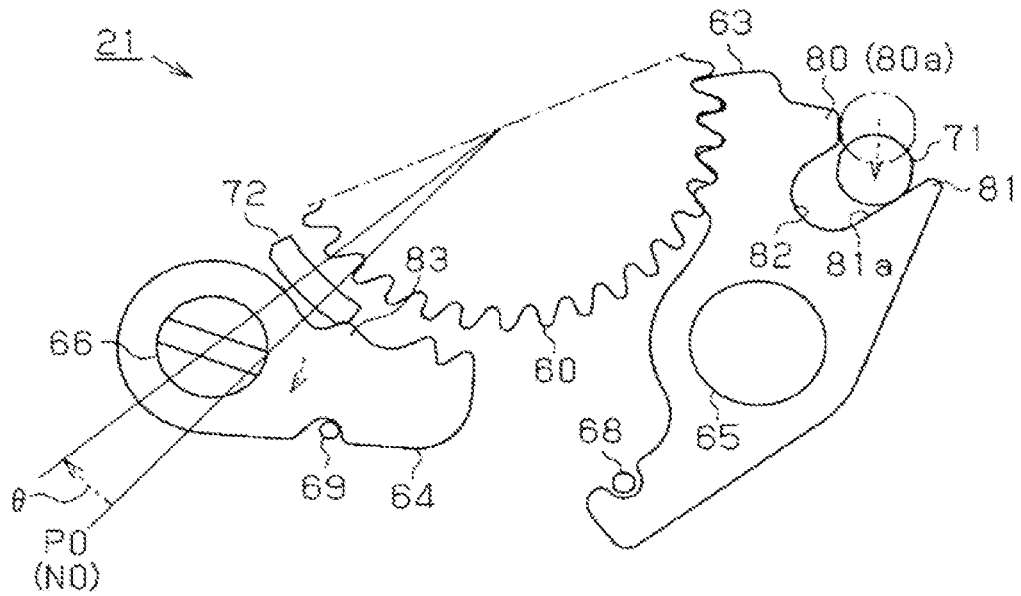
FIG. 24 is an operation explanatory view of the rotation control apparatus (rotation operation in the second direction: halfway)
Figure 25:
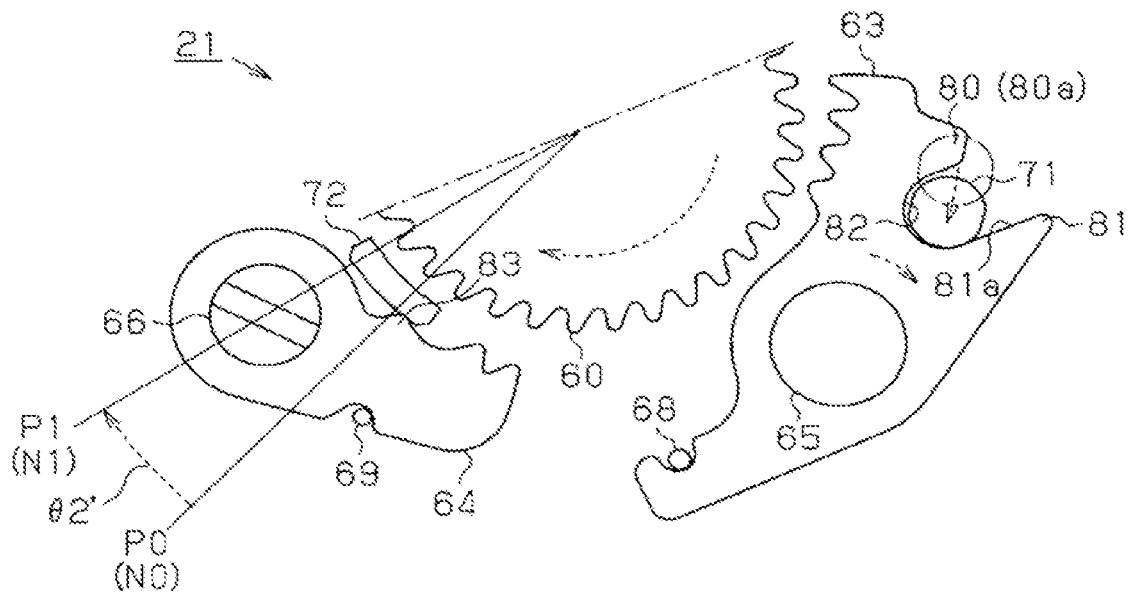
FIG. 25 is an operation explanatory view of the rotation control apparatus (rotation operation in the second direction: maximum)

In the light of the foregoing, as illustrated in FIGS. 24 and 25, the pressing projection 81 is provided so as to intersect with a movement locus of the engagement lever control piece 71 that moves at the radially outer side of the ratchet wheel 60. In a case where the operation handle 20 is operated in the second direction for pushing-down the operation handle 20, the pressing projection 81 is pressed by the engagement lever control piece 71 so that the engagement lever 63 securely rotates in a direction disengaging from the ratchet wheel 60 (i.e., in the clockwise direction in FIGS. 24 and 25).

In each of the engagement levers 63 of the embodiment, a groove portion 82 is provided between the restricting projection 80 and the pressing projection 81. In a case where the operation handle 20 is pushed downward, the engagement lever control piece 71 that moves in the circumferential direction is configured to enter the groove portion 82.

That is, the engagement lever 63 of the embodiment rotates by the engagement lever control piece 71 which presses a side wall 81a of the pressing projection 81 that is continuously provided to the groove portion 82. Accordingly, in the rotation control apparatus 21 of the embodiment, the engagement levers 63 disengage from the ratchet wheel 60 during the rotation operation of the operation handle 20 from the neutral position P0 to the pull-down position P2 (rotation angle θ2', see FIG. 3).

In the rotation control apparatus 21 of the embodiment, based on the rotation operation of the operation handle 20 in the second direction for pressing-down the operation handle 20, each of the drive levers 64 circumferentially moves at the radially outer side of the ratchet wheel 60 so that each of the drive lever control pieces 72 provided at the first bracket 23A makes contact with the drive lever 64 at the radially inner side. Accordingly, the drive lever 64 that is pressed by the drive lever control piece 72 rotates in the clockwise direction in FIG. 24 so as to disengage from the ratchet wheel 60 during the rotation operation of the operation handle 20 from the neutral position P0 to the pull-down position P2.

At this time, a holding engagement portion 83 is provided at the drive lever 64 of the embodiment. The holding engagement portion 83 engages with the drive lever control piece 72 that presses the drive lever 64 during the pull-down operation of the operation handle 20 so as to hold a state where the drive lever 64 disengages from the ratchet wheel 60.

Figure 26A:
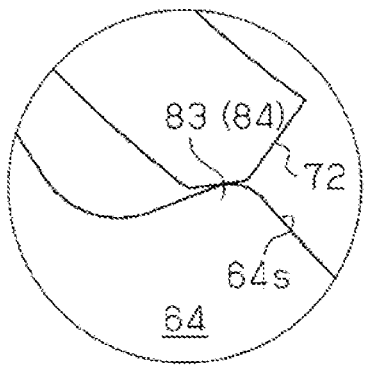
FIG. 26A and FIG. 26B are operation explanatory views of a holding engagement portion provided at a drive lever.
Figure 26B:
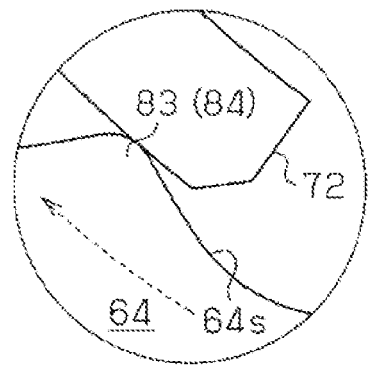

Specifically, as illustrated in FIGS. 26(a) and 26(b), the drive lever control piece 72 in contact with the drive lever 64 slides on a contact surface 64s of the drive lever 64 while pressing the drive lever 64. The drive lever 64 that integrally rotates with the second operation member 62B actually moves from a right side to a left side in FIGS. 26(a) and 26(b). Accordingly, the drive lever control piece 72 slides on the contact surface 64s from the left side to the right side in FIGS. 26(a) and 26(b).

The holding engagement portion 83 of the embodiment includes a step portion 84 which is provided on the contact surface 64s and across which the drive lever control piece 72 may move. In the embodiment, the drive lever control piece 72 at a position where the drive lever control piece 72 moves across the step portion 84 from the left side to the right side in FIGS. 26(a) and 26(b) engages with the holding engagement portion 83. The state where the engagement between the drive lever 64 and the ratchet wheel 60 is released may be thus maintained.

The engagement state between the drive lever control piece 72 and the holding engagement portion 83 is released by the drive lever control piece 72 moving across the step portion 84 formed by the holding engagement portion 83 from the right side to the left side in FIGS. 26(a) and 26(b) during a process where the operation handle 20 returns to the neutral position P0. The state where the drive lever 64 and the ratchet wheel 60 engage with each other is then achieved.

Next, an operation of the seat lifter apparatus 10 including the rotation control apparatus 21 that is configured in the aforementioned manner is explained. As illustrated in FIG. 21, in the rotation control apparatus 21, each of the engagement levers 63 engages with the ratchet wheel 60 in a state where the operation handle 20 is at the neutral position P0

(see FIG. 3). Accordingly, the rotation of the ratchet wheel 60 in the direction in which the seat 1 moves downward, i.e., the rotation of the pinion gear 18 that shares the rotation shaft 22 with the ratchet wheel 60, is restricted.

At this time, the engagement lever control piece 71 makes contact with the engagement lever 63 to restrict the operation of the engagement lever 63 disengaging from the ratchet wheel 60. Accordingly, the rotation of the pinion gear 18 in the direction where the seat 1 moves upward is restricted. The position of the seat 1 in the up-down direction, the seat 1 being supported by the link mechanism 12, is thus stably maintained.

As illustrated in FIGS. 22 and 23, in the rotation operation of the operation handle 20 in the first direction for pulling-up the operation handle 20, each of the drive levers 64 which is integrally provided at the second operation member 62B circumferentially moves in the counterclockwise direction in FIGS. 22 and 23 at the radially outer side of the ratchet wheel 60. Accordingly, the drive lever 64 drives the ratchet wheel 60 in engagement with the drive lever 64 to rotate in the direction where the seat 1 moves upward.

At this time, the second operation member 62B rotates in the delayed phase relative to the first operation member 62A. Thus, each of the engagement lever control pieces 71 separates from each of the engagement levers 63 before the drive lever 64 drives to rotate the ratchet wheel 60. In a state where each of the engagement levers 63 is disengageable from the ratchet wheel 60, the drive lever 64 starts driving and rotating the ratchet wheel 60.

Further, at the time of the return operation for returning the operation handle 20 in the lifted-up state to the neutral position P0, the engagement levers 63 in engagement with the ratchet wheel 60 restrict the rotation of the pinion gear 18 in the direction to move the seat 1 downward. At this time, each of the drive levers 64 circumferentially moves in the opposite direction from the direction in which the drive lever 64 drives and rotates the ratchet wheel 60, thereby allowing the operation of the drive lever 64 to disengage from the ratchet wheel 60. Accordingly, in a state where the rotation position (for two pieces of engagement teeth) of the ratchet wheel 60 that is driven to rotate by one time operation of pulling-up the operation handle 20 is maintained, the drive lever 64 is returned from the position N1 corresponding to the pull-up position P1 to the position N0 corresponding to the neutral position P0.

According to the seat lifter apparatus 10 of the embodiment, an input operation for pulling-up the operation handle 20 from the neutral position P0 by the rotation of the operation handle 20 in the first direction and the return operation for returning the operation handle 20 in the lifted-up state to the neutral position P0 are repeated so as to upwardly move the seat 1 supported by the link mechanism 12.

On the other hand, as illustrated in FIGS. 24 and 25, each of the engagement lever control pieces 71 that circumferentially moves in the clockwise direction in FIGS. 24 and 25 at the radially outer side of the ratchet wheel 60 presses the engagement lever 63 to thereby disengage the engagement lever 63 from the ratchet wheel 60 in a case where the operation handle 20 is operated to rotate in the second direction for pushing-down the operation handle 20. At this time, each of the drive levers 64 circumferentially moves in the clockwise direction in FIGS. 24 and 25 at the radially outer side of the ratchet wheel 60 to make contact with the drive lever control piece 72 that is arranged at the radially inner side of the drive lever 64. The drive lever 64 is pressed by the drive lever control piece 72 so as to disengage from the ratchet wheel 60.

According to the seat lifter apparatus 10 of the embodiment, the input operation for pressing-down the operation handle 20 (to the pull-down position P2) from the neutral position P0 by the rotation of the operation handle 20 in the second direction is maintained to thereby allow the rotation of the pinion gear 18. Thus, the seat 1 supported by the link mechanism 12 is movable downward.

According to the aforementioned embodiment, the following effects are obtainable.

(1) The rotation control apparatus 21 includes the ratchet wheel 60 integrally rotating with the pinion gear 18 in a state where the ratchet wheel 60 shares the rotation shaft 22 with the pinion gear 18 and the operation member 62 arranged at a position coaxial with the ratchet wheel 60 to rotate on the basis of the rotation operation relative to the operation handle 20. In addition, the rotation control apparatus 21 includes the engagement levers 63 configured to restrict the rotation of the pinion gear 18 by engaging with the ratchet wheel 60 and the drive levers 64 configured to rotate and drive the pinion gear 18 in the direction where the seat 1 moves upward by integrally rotating with the operation member 62 in a state where the drive levers 64 engage with the ratchet wheel 60 based on the rotation operation of the operation handle 20 in the first direction. Further, the engagement levers 63 are configured to disengage from the ratchet wheel 60 by the rotation of the pinion gear 18 in the direction where the seat 1 moves upward. The rotation control apparatus 21 includes the engagement lever control pieces 71 and the drive lever control pieces 72 which cause the engagement levers 63 and the drive levers 64 respectively to disengage from the ratchet wheel 60 based on the rotation operation of the operation handle 20 in the second direction. The engagement lever control pieces 71 restrict the operation of the engagement levers 63 disengaging from the ratchet wheel 60 in a case where the operation handle 20 is at the neutral position.

According to the aforementioned simple construction, the rotation of the pinion gear 18 which shares the rotation shaft 22 with the ratchet wheel 60 may be controlled. That is, the rotation operation of the operation handle 20 in the first direction for pulling up the operation handle 20 and the rotation operation of the operation handle 20 in the second direction for returning the operation handle 20 to the neutral position P0 are repeated to thereby move upwardly the seat 1 supported by the link mechanism 12. In addition, the operation handle 20 is operated to rotate in the second direction from the neutral position P0 and the obtained rotation position of the operation handle 20 (pull-down position P2) is maintained to thereby move downwardly the seat 1. Further, in a case where the operation handle 20 is at the neutral position P0, the operation of the engagement levers 63 which disengage from the ratchet wheel 60 is restricted so that the rotation position of the pinion gear 18 integrally rotating with the ratchet wheel 60 is maintained. As a result, the position of the seat 1 in the up-down direction, the seat 1 being supported by the link mechanism 12, is stably maintained.

The engagement levers 63, the drive levers 64, the engagement lever control pieces 71 and the drive lever control pieces 72 for controlling the rotation of the ratchet wheel 60 are arranged at the radially outer side of the ratchet wheel 60 to thereby reduce a dimension of the pinion gear 18 along the rotation shaft 22. As a result, the rotation control apparatus 21 is downsized to enhance mountability of the rotation control apparatus 21 to the side of the seat. Further, by utilizing the favorable mountability, a large rotation stroke may be specified at the operation handle 20. The operation performance of the operation handle 20 may thus improve. Further, the ratchet wheel 60 and each of the engagement levers 63 and the ratchet wheel 60 and each of the drive levers 64 form the plural ratchet mechanisms which are independent from one another. Thus, even in a case where the rotation shaft 22 of the pinion gear 18 is inclined due to an application of an external force to the seat 1, for example, the rotation position of the pinion gear 18 may be stably maintained. A high reliability may be therefore ensured.

(2) The rotation control apparatus 21 includes the first and second operation members 62A, 62B provided to be relatively rotatable to each other, the connection mechanism 32 capable of rotating the second operation member 62B in the delayed phase relative to the first operation member 62A based on the rotation operation of the operation handle 20, and the torsion coil springs 68, 69 biasing the engagement levers 63 and the drive levers 64 so that the engagement levers 63 and the drive levers 64 engage with the ratchet wheel 60. The engagement levers 63 are disposed at the radially outer side of the ratchet wheel 60 to be rotatable in a state being supported by the respective support shafts 65 provided at the bracket 23 that supports the rotation shaft 22. The drive levers 64 are disposed at the radially outer side of the ratchet wheel 60 to be rotatable in a state being supported by the respective support shafts 65 provided at the second operation member 62B. The engagement lever control pieces 71 are provided at the first operation member 62A and the drive lever control pieces 72 are provided at the bracket 23. In a case where the operation handle 20 is at the neutral position P0, the engagement lever control pieces 71 make contact with the respective engagement levers 63 which engage with the ratchet wheel 60 to thereby restrict the rotation of the engagement levers 63. In addition, the engagement lever control pieces 71 press the respective engagement levers 63 so that each of the engagement levers 63 rotates in a direction disengaging from the ratchet wheel 60 by the relative rotation between the first operation member 62A and the bracket 23 based on the rotation operation of the operation handle 20 in the second direction. The drive lever control pieces 72 press the respective drive levers 64 so that each of the drive levers 64 rotates in a direction disengaging from the ratchet wheel 60 by the relative rotation between the second operation member 62B and the bracket 23 based on the rotation operation of the operation handle 20 in the second direction.

According to the aforementioned construction, in the case where the operation handle 20 is at the neutral position P0, the engagement lever control pieces 71 make contact with the respective engagement levers 63 to restrict the rotations of the engagement levers 63. Because the rotations of the engagement levers 63 are restricted so that the engagement levers 63 are unable to disengage from the ratchet wheel 60, the rotation position of the pinion gear 18 which integrally rotates with the ratchet wheel 60 is maintained. In a case where the operation handle 20 is operated to rotate in the first direction, the engagement lever control pieces 71 separate from the respective engagement levers 63 based on a phase difference between the first and second operation members 62A and 62B and thereafter the ratchet wheel 60 is started to be driven to rotate by the drive levers 64 in a state where the engagement levers 63 are disengageable from the ratchet wheel 60. Then, the interference between the engagement levers 63 and the ratchet wheel 60 is inhibited to ensure a smooth operation start of the pinion gear 18 which integrally rotates with the ratchet wheel 60.

Each of the engagement levers 63 includes the restricting projection 80 protruding to the radially outer side of the ratchet wheel 60 in the engagement state of the engagement lever 63 with the ratchet wheel 60. In a case where the operation handle 20 is at the neutral position P0, the engagement lever control piece 71 makes contact with the end 80*a* of the restricting projection 80.

According to the aforementioned construction, in a case where the operation handle 20 is at the neutral position P0, the engagement lever control piece 71 is configured to make contact with the engagement lever 63 in a limited way. Accordingly, without interrupting the operation start of the ratchet wheel 60 based on the rotation operation of the operation handle 20, the rotation position of the ratchet wheel 60 may be securely maintained in a case where the operation handle 20 is at the neutral position P0.

(4) Each of the engagement levers 63 includes the pressing projection 81 protruding to the radially outer side than the restricting projection 80. The engagement lever control piece 71 presses the pressing projection 81 based on the rotation operation of the operation handle 20 in the second direction.

According to the aforementioned construction, even with the construction where the restricting projection 80 is provided, the engagement lever control piece 71 may securely press the engagement lever 63 based on the rotation operation of the operation handle 20 in the second direction.

(5) The plural engagement bores 35 extending in the circumferential direction are provided at the first input member 28A constituting the first operation member 62A. The engagement projections 37 which are inserted to the aforementioned engagement bores 35 are provided at the connection member 38 which connects the operation plate 61 constituting the second operation member 62B and the second input member 28B to be relatively non-rotatable to each other. As a result, the connection mechanism 32 where (the disc portion 33 of) the first input member 28A, at which the engagement bores 35 are provided, serves as a first engagement body and the connection member 38 serves as a second engagement body is constituted.

According to the aforementioned construction, in a case where the rotation torque is input to one of the first and second input members 28A and 28B, the engagement projection 37 moves within the engagement bore 35 relative thereto so as to reduce the circumferential gap in the engagement bore 35. As a result, the relative rotation between the first input member 28A and the second input member 28B is permitted. Afterwards, the engagement projection 37 which moves within the engagement bore 35 engages with either of the circumferential end portions of the engagement bore 35 so that the torque transmission is achievable via the connection member 38. Consequently, the other of the first and second input members rotates by the delayed phase.

That is, while the engagement projection 37 moves within the engagement bore 35 relative thereto based on the rotation operation of the operation handle 20, the rotation torque of the first operation member 62A is inhibited from being transmitted to the second operation portion 62B. Accordingly, with a simple construction, the second operation member 62B may rotate in the delayed phase from the first operation member 62A.

(6) The rotation control apparatus 21 includes the handle returning apparatus 31 which returns the operation handle 20 to the neutral position and which specifies the relative rotation position between the first operation member 62A and the second operation member 62B at the neutral position P0 so that the engagement projection 37 separates from the circumferential end portions of each of the engagement bores 35 with which the engagement projection 37 engages at the time of the rotation operation of the operation handle 20.

According to the aforementioned construction, the second operation member 62B may further securely rotate in the delayed phase from the first operation member 62A. In addition, the relative position between the first and second operation members 62A and 62B is specified at the neutral position P0 so that each of the components of the rotation control apparatus 21 may return to an appropriate position. As a result, the secure operations of the first and second operation members 62A and 62B may be guaranteed.

(7) The drive lever 64 includes the holding engagement portion 83 configured to hold a state where the drive lever 64 disengages from the ratchet wheel 60 by engaging with the drive lever control piece 72 that presses the drive lever 64. According to the aforementioned construction, a so-called "delay" may be applied to the operation of the drive lever 64. Accordingly, the state where the drive lever 64 engages with the ratchet wheel 60 and the state where the aforementioned engagement is released may be clearly distinguished. As a result, the interference between the ratchet wheel 60 and the drive lever 64 at the shifting between the engagement state and the disengagement state may be reduced to ensure a further smooth operation.

(8) The rotation control apparatus 21 includes plural (in the embodiment, two) sets of the engagement lever 63, the drive lever 64, the engagement lever control piece 71 and the drive lever control piece 72. The two sets of the engagement lever 63, the drive lever 64, the engagement lever control piece 71 and the drive lever control piece 72 are arranged at even intervals around the ratchet wheel 60 in the circumferential direction thereof.

According to the aforementioned construction, the pinion gear 18 which shares the rotation shaft 22 with the ratchet wheel 60 may be securely driven to rotate in a balanced manner and the rotation position thereof may be maintained.

(9) The elongated bores 76 guiding the engagement lever control pieces 71 in a state where the engagement lever control pieces 71 penetrate through the elongated bores 76 are provided at the first bracket 23A.

According to the aforementioned construction, a support rigidity of the engagement lever control pieces 71 may be enhanced. Specifically, the tip end 74a of the axial member 74 constituting the engagement lever control piece 71 is supported by the first operation member 62A in a cantilever manner. Thus, the tip end 74a is supported by the wall surface of the elongated bore 76 to thereby obtain further remarkable effect. The engagement levers 63 may be further securely pressed.

(10) Each of the support shafts 65 of the engagement levers 63 is disposed in the direction intersecting with the engagement surface S1 between the engagement lever 63 and the ratchet wheel 60 and each of the support shafts 66 of the drive levers 64 is disposed in the direction intersecting with the engagement surface S2 between the drive lever 64 and the ratchet wheel 60. Because of such construction, the ratchet mechanisms may be obtained between the ratchet wheel 60 and the engagement lever 63 and between the ratchet wheel 60 and the drive lever 64.

Second Embodiment

A second embodiment of the seat lifter apparatus for the vehicle is explained with reference to drawings. The same constructions of the second embodiment as those of the first embodiment bear the same reference numerals and explanation is omitted for convenience.

Figure 27:
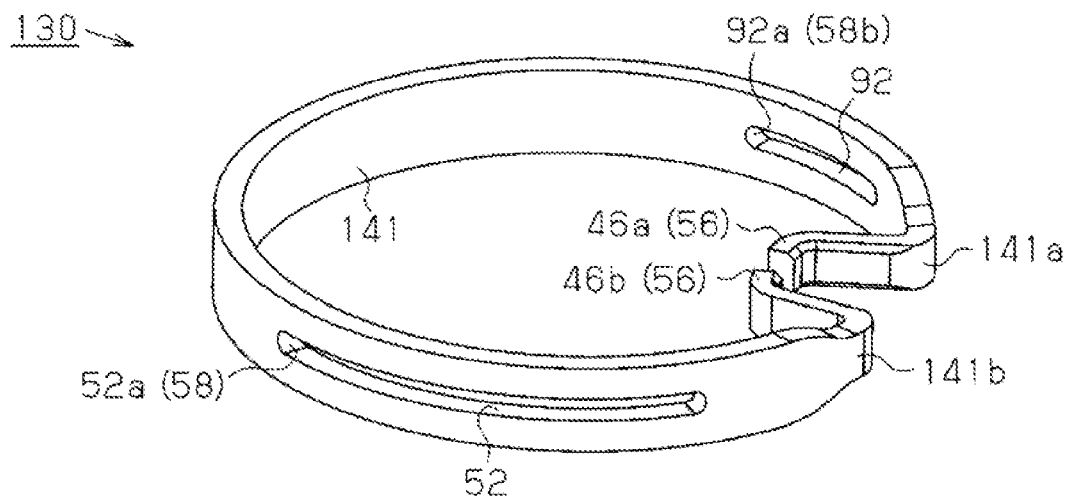
FIG. 27 is a perspective view of a spring member according to a second embodiment.
Figure 28:
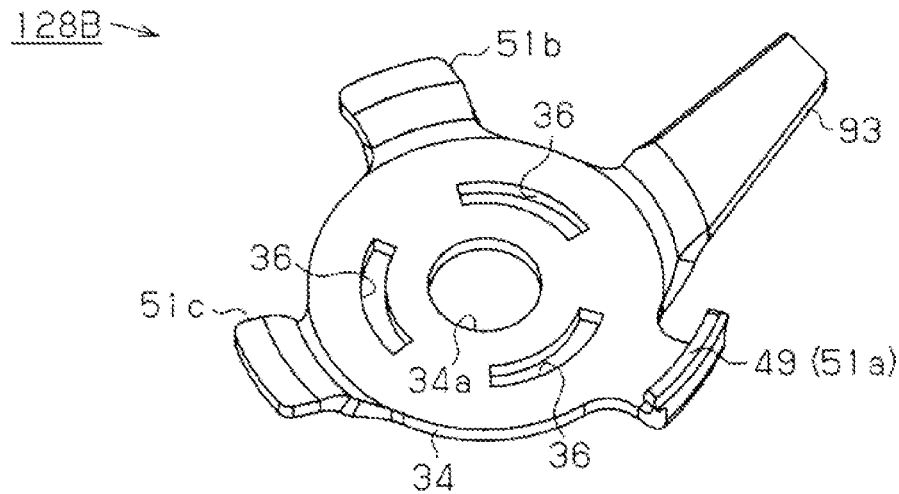
FIG. 28 is a perspective view of a second input member according to the second embodiment.
Figure 29:
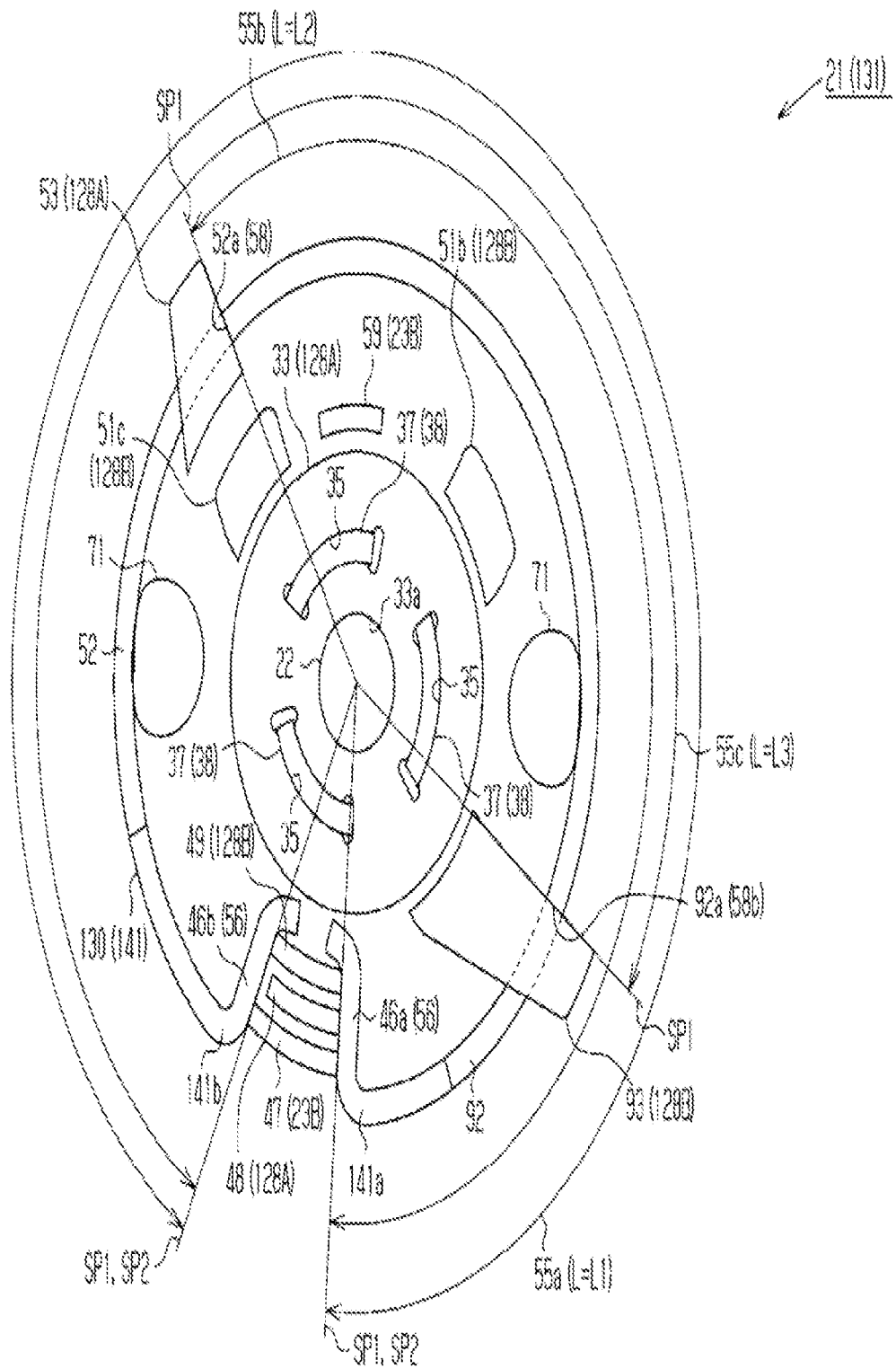
FIG. 29 is an operation explanatory view of a handle returning apparatus according to the second embodiment (neutral position)

As illustrated in FIGS. 27 to 29, in the present embodiment, a spring member 130 constituting a handle returning apparatus 131 includes plural bore portions penetrating through a spring body 141 in a radial direction thereof. In the spring member 130 of the embodiment, the spring body 141 includes the bore portion 52 into which the engagement projecting portion 53 provided at the first input member 28A is inserted, in the same way as the spring member 30 according to the first embodiment. The bore portion 52 includes the circumferential end portion 52a functioning as the first intermediate engagement portion 58 with which the engagement projecting portion 53 is engageable. The spring member 130 of the embodiment further includes a bore portion 92 provided at a position in the circumferential direction of the spring body 141 different from the position of the bore portion 52.

The bore portion 52 is provided at a position close to a second end portion 141b in the circumferential direction of the spring body 141. On the other hand, the bore portion 92 is provided at a position close to a first end portion 141a. In the present embodiment, the bore portion 92 also includes the elongated from extending in the circumferential direction. The circumferential length of the bore portion 92 is specified to be shorter than the bore portion 52.

In the present embodiment, a second input member 128B includes an engagement projection 93 inserted into the bore portion 92. The bore portion 92 includes a circumferential end portion 92a functioning as a second intermediate engagement portion 58b with which the engagement projection 93 which is inserted into the bore portion 92 is engageable on a basis of the rotation operation relative to the operation handle 20.

As illustrated in FIG. 29, the spring member 130 of the embodiment includes a third spring portion 55c including the second intermediate engagement portion 58b of the bore portion 92 as the first spring end portion SP1 and the end engagement portion 56 at the second end portion 141b of the spring body 141 as the second spring end portion SP2. In the same way as the second spring portion 55b including the first intermediate engagement portion 58 of the bore portion 52 as one of the spring end portions SP1 and SP2, the third spring portion 55c functions as, because of its short effective spring length L3, the reinforced spring portion that may generate a greater returning force than the first spring portion 55a serving as the base spring portion including the two end engagement portions 56 as the spring end portions SP1 and SP2. The handle returning apparatus 31 of the embodiment is configured to generate the returning force for returning the operation handle 20 to the neutral position P0 by either of the first to third spring portions 55a to 55c based on the direction of the rotation operation input to the operation handle 20.

Figure 30:
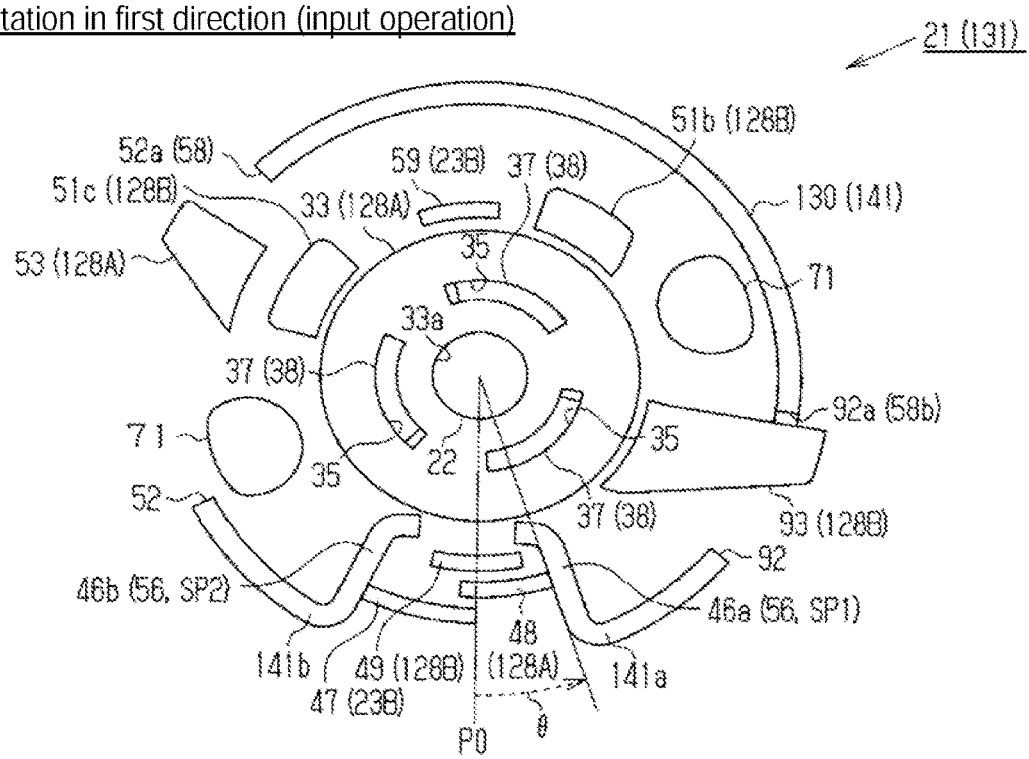
FIG. 30 is an operation explanatory view of the handle returning apparatus according to the second embodiment (rotation operation in the first direction: input operation)
Figure 31:
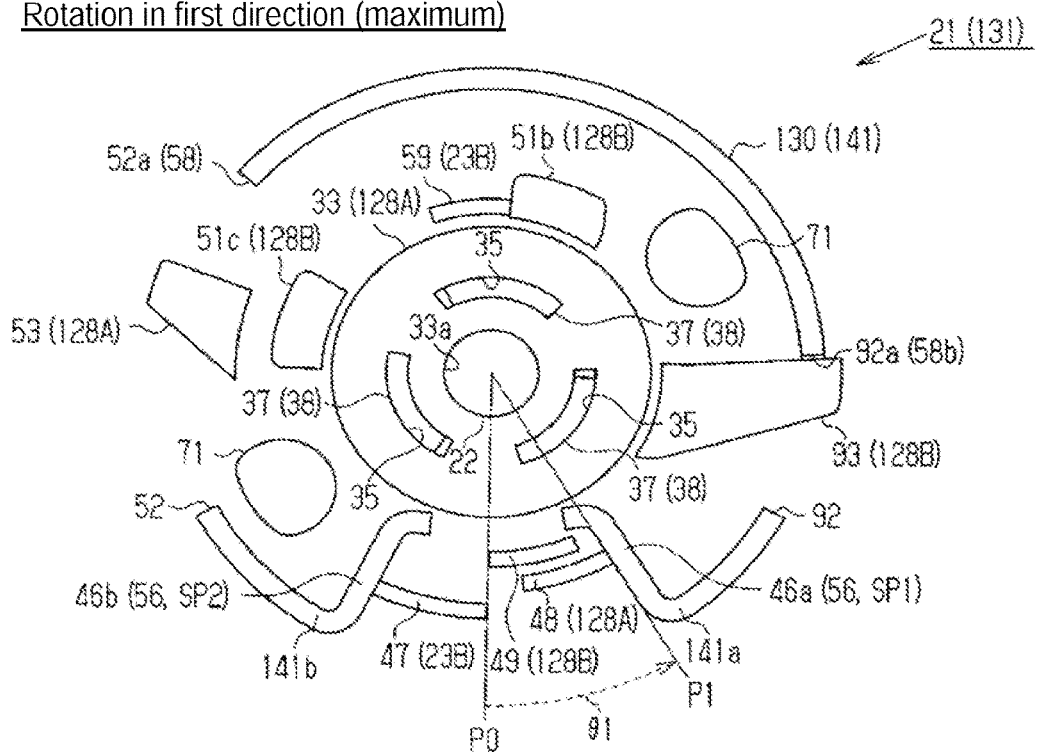
FIG. 31 is an operation explanatory view of the handle returning apparatus according to the second embodiment (rotation operation in the first direction: maximum)

Specifically, as illustrated in FIGS. 30 and 31, the first spring portion 55a generates the returning force for returning the operation handle 20 to the neutral position P0 in the same way as the first embodiment in a case where the operation handle 20 is operated to rotate in the first direction, i.e., at the time of the input operation for pulling up the operation handle 20 from the neutral position P0.

That is, at this time, the second input member 128B rotates in the delayed phase relative to the first input member 128A. Thus, the engagement projecting portion 48 provided at the first input member 128A engages with the end engagement portion 56 at the first end portion 141a before the engagement projection 93 provided at the second input member 128B makes contact with the circumferential end portion 92a of the bore portion 92 constituting the second intermediate engagement portion 58b. Accordingly, the spring member 130 is pressed in the counterclockwise direction in FIGS. 30 and 31, i.e., in the first direction, so that the engagement projection 93 and the circumferential end portion 92a of the bore portion 92 are brought to a separated state. The handle returning apparatus 131 of the embodiment is configured to maintain the aforementioned separated state at the pull-up position P1 which is generated by the maximum operation amount α1 of the operation handle 20 in the first direction.

Figure 32:
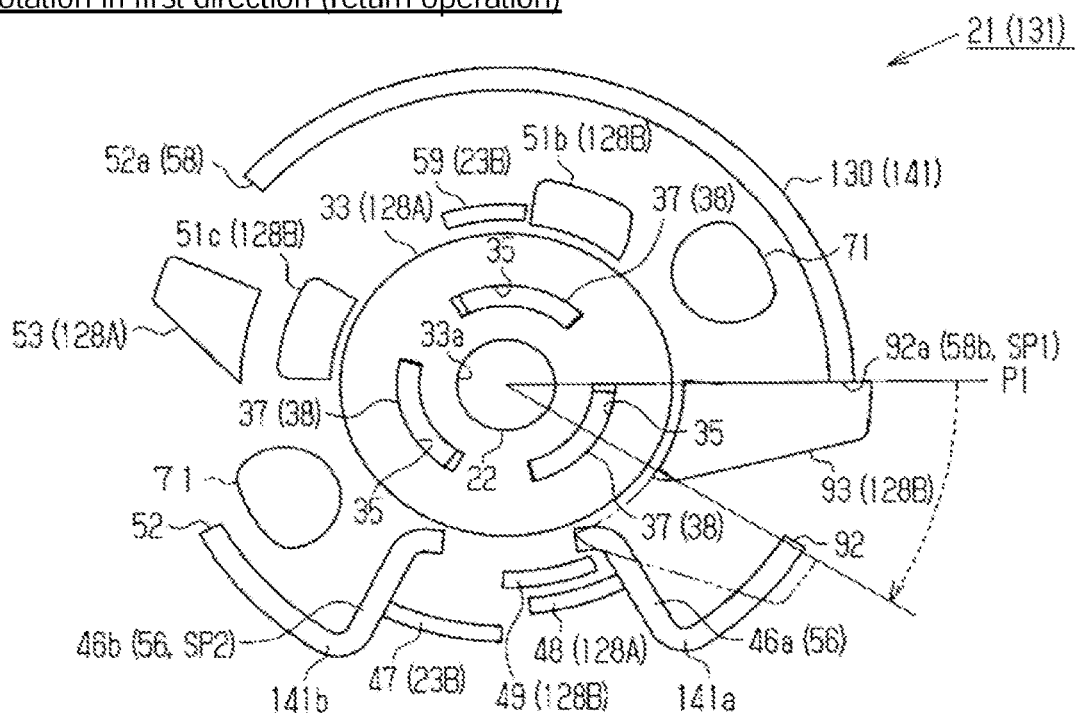
FIG. 32 is an operation explanatory view of the handle returning apparatus according to the second embodiment (rotation operation in the first direction: urn operation)

On the other hand, as illustrated in FIG. 32, in a case where the pull-up operation for rotating the operation handle 20 in the first direction is stopped, the first and second input members 128A and 128B are configured to rotate in the clockwise direction in FIG. 32, i.e., in the second direction, based on the returning force generated by the spring member 130.

At this time, according to the handle returning apparatus 131 of the embodiment, the engagement projection 93 provided at the second input member 128B makes contact with the circumferential end portion 92a of the bore portion 92. That is, at the time of the return operation for returning the operation handle 20, which is operated to rotate in the first direction, to the neutral position P0, the third spring portion 55c including the second intermediate engagement portion 58b of the bore portion 92 as the first spring end portion SP1 and the end engagement portion 56 at the second end portion 141b of the spring body 141 as the second spring end portion SP2 is configured to be elastically deformed. The handle returning apparatus 131 of the embodiment returns the operation handle 20 to the neutral position P0 based on the returning force generated by the third spring portion 55c which is elastically deformed.

Then, in a case where the operation handle 20 is operated to rotate in the second direction, in the same way as the first embodiment, the second spring portion 55b including the first intermediate engagement portion 58 of the bore portion 52 as the first spring end portion SP1 and the end engagement portion 56 of the first end portion 141a as the second spring end portion SP2 generates the returning force for returning the operation handle 20 to the neutral position P0.

Figure 33:
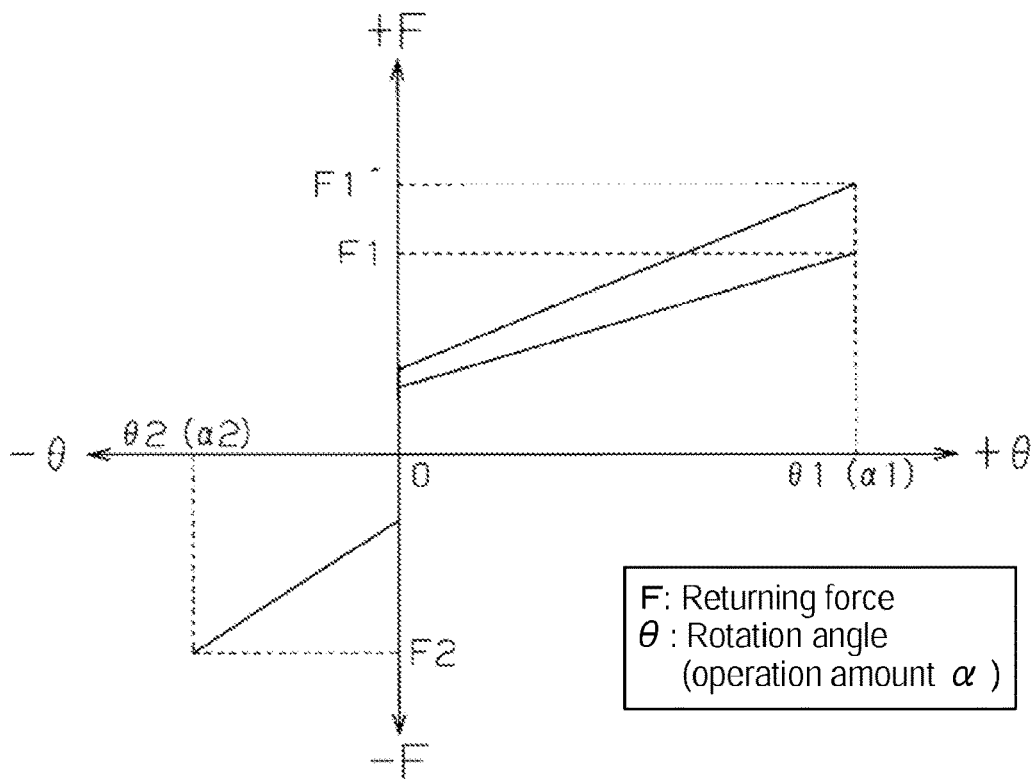
FIG. 33 is an operation explanatory view of the handle returning apparatus according to the second embodiment.

Next, the operation of the handle returning apparatus 131 according to the present embodiment configured as above is explained. In the embodiment, as illustrated in FIG. 33, at the time of the return operation for returning the operation handle 20, which is operated to rotate in the first direction, to the neutral position P0, the third spring portion 55c constituted as the reinforced spring portion (L=L3<L1) including the short effective spring length L, i.e., the large spring force, is utilized to thereby generate the greater returning force F. In FIG. 33, "F1" is a maximum value of the returning force F in the input operation where the first spring portion 55a is utilized and "F1'" is a maximum value of the returning force F in the return operation where the third spring portion 55c is utilized (F1'>F1). In the embodiment, the usage of the third spring portion 55c may increase the returning performance of the operation handle 20 to the neutral position P0. Accordingly, the relative position of the first and second input members 128A and 128B at the neutral position P0 is accurately specified and each of the components of the rotation control apparatus 21 is returned to an appropriate position, which may guarantee the secure operations of the first and second input members 128A and 128B.

As mentioned above, according to the construction of the embodiment, the returning force (F1) in the input operation for rotating the operation handle 20 from the neutral position P0 and the returning force (F1') in the return operation for returning the operation handle 20 to the neutral position P0 may be specified to different values from each other. As a result, further favorable operation performance may be ensured.

In addition, in a case where each of the components is operated on the basis of the returning force (F) which is generated by the spring member 130 in the return operation, as in the rotation control apparatus 21 constituting the seat lifter apparatus 10, the increase of the returning force (F1') in the return operation may accurately specify the relative position of the first and second input members 128A and 128B. As a result, each of the components of the rotation control apparatus 21 is returned to the appropriate position, which may guarantee the secure operation of each of the components.

The aforementioned embodiments may be modified as below. In each of the aforementioned embodiments, the sector gear 16 is provided at the rear link 15 connected to the right-side frame 13 in a state where the connection point X2 between the aforementioned side frame 13 and the rear link 15 serves as the rotation center of the sector gear 16. The construction is not limited to the above and the sector gear 16 may be provided at the other link member 11. The rotation center which is shared between the sector gear 16 and the link member 11 may be the connection point (X1, X2) between the side frame 13 serving as a connection member at the seat side and the link member 11 or may be the connection point (X3, X4) between the support member 8 serving as a connection member at the floor side and the link member 11.

Further, in each of the aforementioned embodiments, each of the two link members 11 forms a known parallel link mechanism. The construction is not limited to the above and the form of the link mechanism, including the number of link members 11, may be arbitrary changed as long as the seat 1 supported at the upper side of the link members 11 is capable of moving upward and downward on the basis of the rotation of each of the link members 11.

In each of the aforementioned embodiments, the operation handle 20 is fixed to the operation member 62 (first operation member 62A). The operation member 62 integrally rotates with the operation handle 20 by the rotation operation of the operation handle 20. The construction is not limited to the above and the operation handle 20 and the operation member 62 may be connected via a gear, for example. The operation handle 20 and the operation member 62 may not be necessarily coaxially arranged each other.

Further, in each of the aforementioned embodiments, the rotation operation for pulling up the operation handle 20 serves as the rotation operation in the first direction, and the rotation operation for pushing down the operation handle 20 serves as the rotation operation in the second direction. The construction is not limited to the above. The rotation operation for pushing down the operation handle 20 may serve as the rotation operation in the first direction and the rotation operation for pulling up the operation handle 20 may serve as the rotation operation in the second direction.

In each of the aforementioned embodiments, the first bracket 23A fixed to the side frame 13 and the second bracket 23B provided facing the first bracket 23A are provided as the two brackets 23. Each of the first bracket 23A and the second bracket 23B is formed by deformation processing (press-working) of a metallic plate. The construction is not limited to the above. The construction of the brackets 23 such as the number, configuration and material, for example, of the brackets 23 may be arbitrarily changed. Further, for example, the elongated bores 76 into which the respective engagement lever control pieces 71 are inserted may not be provided at the first bracket 23A.

In each of the aforementioned embodiments, the second operation member 62B rotates in the delayed phase relative to the first operation member 62A at the time of the rotation operation in the first direction for pulling up the operation handle 20 which is disposed at the neutral position P0. The construction is not limited to the above. At the time of the rotation operation in the second direction for pushing down the operation handle 20 which is disposed at the neutral position P0, the second operation member 62B may rotate in the delayed phase in a positive manner from the first operation member 62A.

For example, in each of the aforementioned embodiments, at the neutral position P0, the relative rotation position between the first operation member 62A and the second operation member 62B is specified so that, within each of the engagement bores 35 constituting the connection mechanism 32, each of the engagement projections 37 is separated from the circumferential end portion 35a of each of the engagement bores 35 with which the engagement projection 37 engages at the time of the rotation operation of the operation handle 20 in the first direction. The construction is not limited to the above. At the neutral position P0, each of the engagement projections 37 may be separated from the circumferential end portion 35a of each of the engagement bores 35 with which the engagement projection 37 engages at the time of the rotation operation of the operation handle 20 in the second direction. Accordingly, at the time of the rotation operation in the second direction, the second operation member 62B may also securely rotate in the delayed phase relative to the first operation member 62A.

Further, at the time of the rotation operation of the operation handle 20 in the second direction, the second operation member 62B may be configured to rotate without the delay from the first operation member 62A. This is easily achievable by a construction where each of the engagement projections 37 makes contact with the circumferential end portion 35b of each of the engagement bores 35 at the neutral position P0.

In each of the embodiments, the first input member 28A (128A) including the plural (three) engagement bores 35 serves as the first engagement body while the connection member 38 connected to the second input member 28B (128B) serves as the second engagement body to thereby constitute the connection mechanism 32. The construction is not limited to the above. The second input member 28B may serve as the first engagement body including the plural engagement bores and the first input member 28A may serve as the second engagement body including the plural engagement projections which engage with the aforementioned respective engagement bores. Further, the first engagement body and the second engagement body provided separately from the first and second input members 28A and 28B may form the connection mechanism 32. The numbers and configurations, for example, of the first engagement bores 35 and the engagement projections 37 may be appropriately changed. As long as the first input member 28A and the second input member 28B are connected so that the torque transmission therebetween is achievable, and one of the first input member 28A and the second input member 28B is rotatable in the delayed phase relative to the other of the first input member 28A and the second input member 28B, the connection mechanism 32 may be obtained by other constructions than the engagement between the engagement bores 35 and the engagement projections 37.

In each of the embodiments, the handle returning apparatus 31 (131) is configured so that the operation handle 20 that is operated to rotate is returned to the neutral position P0 based on the elastic force of the spring member 30 (130) formed as a so-called ring spring. The construction is not limited to the above. The construction of the handle returning apparatus 31, including the spring member 30, may be arbitrarily changed. For example, a construction where a normal spring member at which a spring body itself constitutes one spring portion is applicable.

The configuration of the spring member 30 (130) may be also arbitrarily changed. For example, the configuration of the spring body 41 (141) may not necessarily include the substantially C-shape and may include a bending configuration in a polygonal shape. A method for forming the intermediate engagement portion of the spring body may be arbitrarily changed. For example, the bore portion 52 may be obtained by cutting an end portion of the spring member 30 (130) in the width direction. The engagement projection serving as the intermediate engagement portion may be provided at the spring body.

Further, the configuration of the engagement lever 63, including the restricting projection 80 and the pressing projection 81, may be arbitrarily changed. The configuration of the drive lever 64, including the holding engagement portion 83, may be arbitrarily changed.

In each of the aforementioned embodiments, the rotation control apparatus 21 is configured to include the first and second operation members 62A and 62B. The construction is not limited to the above. The engagement levers 63, the drive levers 64, the engagement lever control pieces 71 and the drive lever control pieces 72 may be configured to operate by the rotation of the single operation member 62. Considering the smooth operation start of the ratchet wheel 60, the interference between the engagement levers 63 and the ratchet wheel 60 may be desirably avoided by utilizing the phase difference between the first and second operation members 62A and 62B as in each of the aforementioned embodiments.

In each of the aforementioned embodiments, two sets of the engagement lever 63, the drive lever 64, the engagement lever control piece 71 and the drive lever control piece 72 are provided. Alternatively, one set, three sets or more than three sets may be provided. In addition, plural sets of the engagement lever 63, the drive lever 64, the engagement lever control piece 71 and the drive lever control piece 72 may not be necessary arranged at even intervals.

The invention claimed is:
1. A seat lifter apparatus for a vehicle, comprising:
a link mechanism supporting a seat at an upper side of the link mechanism via a link member which is rotatably provided;
a sector gear integrally rotating with the link member by sharing a rotation shaft with the link member;
a pinion gear meshed with the sector gear;
an operation handle operated to rotate in a first direction and a second direction by including a neutral position; and
a rotation control apparatus disposed between the pinion gear and the operation handle,
the rotation control apparatus including:
a ratchet wheel integrally rotating with the pinion gear by sharing a rotation shaft with the pinion gear;

an operation member arranged at a position coaxial with the ratchet wheel to rotate on a basis of a rotation operation of the operation handle;

an engagement lever configured to restrict a rotation of the pinion gear by engaging with the ratchet wheel; and a drive lever driving and rotating the pinion gear in a direction where the seat moves upward by integrally rotating with the operation member in a state where the drive lever engages with the ratchet wheel based on the rotation operation of the operation handle in the first direction, the engagement lever disengaging from the ratchet wheel by the rotation of the pinion gear in a case where the seat moves upward, the rotation control apparatus further including an engagement lever control piece and a drive lever control piece which cause the engagement lever and the drive lever respectively to disengage from the ratchet wheel based on the rotation operation of the operation handle in the second direction, the engagement lever control piece restricting an operation of the engagement lever disengaging from the ratchet wheel in a case where the operation handle is at the neutral position.

2. The seat lifter apparatus for the vehicle according to claim 1, wherein the operation member includes first and second operation members provided to be relatively rotatable to each other, the rotation control apparatus further including:

a bracket supporting the rotation shaft;

a connection mechanism connecting between the first operation member and the second operation member so that a torque transmission is achievable between the first operation member and the second operation member, the connection mechanism causing the second operation member to rotate in a delayed phase relative to the first operation member based on the rotation operation of the operation handle; and a biasing member biasing the engagement lever and the drive lever so that the engagement lever and the drive lever engage with the ratchet wheel, the engagement lever is arranged to be rotatable at a radially outer side of the ratchet wheel in a state where the engagement lever is supported at a support shaft provided at the bracket, the drive lever is arranged to be rotatable at the radially outer side of the ratchet wheel in a state where the drive lever is supported at a support shaft provided at the second operation member, the engagement lever control piece is provided at the first operation member to press the engagement lever so that the engagement lever rotates in a direction disengaging from the ratchet wheel by a relative rotation between the first operation member and the bracket based on the rotation operation of the operation handle in the second direction, and to restrict the rotation of the engagement lever by making contact with the engagement lever which engages with the ratchet wheel in a case where the operation handle is at the neutral position, the drive lever control piece is provided at the bracket to press the drive lever so that the drive lever rotates in a direction disengaging from the ratchet wheel by a relative rotation between the second operation member and the bracket based on the rotation operation of the operation handle in the second direction.

3. The seat lifter apparatus for the vehicle according to claim 2, wherein the engagement lever includes a restricting projection protruding to the radially outer side of the ratchet wheel in an engagement state of the engagement lever with the ratchet wheel, the engagement lever control piece makes contact with an end of the restricting projection in a case where the operation handle is at the neutral position.

4. The seat lifter apparatus for the vehicle according to claim 3, wherein the engagement lever includes a pressing projection protruding to a radially outer side than the restricting projection, the engagement lever control piece presses the pressing projection based on the rotation operation of the operation handle in the second direction.

5. The seat lifter apparatus for the vehicle according to claim 2, wherein the connection mechanism includes:

a first engagement body including a circular portion and provided with an engagement bore extending in a circumferential direction of the circular portion; and a second engagement body including an engagement projection inserted to be positioned within the engagement bore.

6. The seat lifter apparatus for the vehicle according to claim 5, wherein the rotation control apparatus further includes a handle returning apparatus which returns the operation handle to the neutral position and which specifies a relative rotation position between the first operation member and the second operation member at the neutral position so that the engagement projection separates from a circumferential end portion of the engagement bore with which the engagement projection engages at a time of the rotation operation of the operation handle.

7. The seat lifter apparatus for the vehicle according to claim 1, wherein the drive lever includes a holding engagement portion configured to hold a state where the drive lever disengages from the ratchet wheel by engaging with the drive lever control piece that presses the drive lever.

8. The seat lifter apparatus for the vehicle according to claim 1, wherein the rotation control apparatus further includes a plurality of sets of the engagement lever, the drive lever, the engagement lever control piece and the drive lever control piece.

9. The seat lifter apparatus for the vehicle according to claim 8, wherein the plurality of sets of the engagement lever, the drive lever, the engagement lever control piece and the drive lever control piece is arranged at even intervals in a circumferential direction of the ratchet wheel.

10. The seat lifter apparatus for the vehicle according to claim 2, wherein the bracket includes an elongated bore which guides the engagement lever control piece in a state where the engagement lever control piece penetrates through the elongated bore.

11. The seat lifter apparatus for the vehicle according to claim 2, wherein the support shaft supporting the engagement lever is arranged in a direction intersecting with an engagement surface between the engagement lever and the ratchet wheel, the support shaft supporting the drive lever is arranged in a direction intersecting with an engagement surface between the drive lever and the ratchet wheel.

12. The seat lifter apparatus for the vehicle according to claim 5, wherein the connection mechanism allows a relative rotation between the first engagement body and the second engagement body based on the rotation operation of the operation handle by a relative movement of the engagement projection within the engagement bore, the first engagement body and the second engagement body are connected to each other so that a torque transmission is achievable between the first engagement body and the second engagement body by the engagement of the engagement projection with the circumferential end portion of the engagement bore.

* * * * *